US012764242B2

(12) United States Patent
Takaba et al.

(10) Patent No.: US 12,764,242 B2
(45) Date of Patent: Oct. 13, 2026

(54) CONTROL METHOD AND STORAGE MEDIUM

(71) Applicant: CANON KABUSHIKI KAISHA, Tokyo (JP)

(72) Inventors: Ryo Takaba, Kanagawa (JP); Yu Matsumoto, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 199 days.

(21) Appl. No.: 18/888,624

(22) Filed: Sep. 18, 2024

(65) Prior Publication Data

US 2025/0106339 A1 Mar. 27, 2025

(30) Foreign Application Priority Data

Sep. 25, 2023 (JP) ................................. 2023-160117

(51) Int. Cl.
*H04N 1/00* (2006.01)

(52) U.S. Cl.
CPC ..... *H04N 1/00962* (2013.01); *H04N 1/00925* (2013.01)

(58) Field of Classification Search
None
See application file for complete search history.

(56) References Cited

U.S. PATENT DOCUMENTS

2015/0286450 A1* 10/2015 Yang ..................... G06F 3/1236 358/1.15
2016/0353237 A1 12/2016 Shepherd
2017/0126928 A1* 5/2017 Kawai ................ H04N 1/00307
2021/0068173 A1 3/2021 Yore
2022/0345576 A1* 10/2022 Suzaki ............... H04N 1/00503

FOREIGN PATENT DOCUMENTS

EP 3885890 A1 9/2021
JP 2021153265 A 9/2021
JP 2022030782 A 2/2022

* cited by examiner

*Primary Examiner* — Fan Zhang
(74) *Attorney, Agent, or Firm* — Canon U.S.A., Inc. IP Division

(57) ABSTRACT

A program is provided for executing, in a case where a predetermined setting for permitting a predetermined application program to use a location-based service is not set to be enabled in a first information processing apparatus, first processing for setting the predetermined setting to be enabled, based on an OS of the first information processing apparatus being a first version and the predetermined setting not being set to be enabled in the first information processing apparatus.

20 Claims, 14 Drawing Sheets

CONTROL METHOD AND STORAGE MEDIUM

BACKGROUND OF THE INVENTION

Field of the Invention

The present invention relates to a control method and a storage medium.

Description of the Related Art

Japanese Patent Laid-Open No. 2022-30782 describes a technique regarding permission of use of a location-based service.

As a form in which it is possible to permit an application program to use a location-based service becomes more widespread, it is desired to improve the convenience of the form.

SUMMARY OF THE INVENTION

The present invention provides a technique for improving convenience of a form in which it is possible to permit an application program to use a location-based service.

According to the present invention, a method of controlling a first information processing apparatus having a predetermined application program and an operating system (OS) of a first version and a second information processing apparatus having the predetermined application program and an OS of a second version older than the first version, the method of controlling the first information processing apparatus including: in a case where a predetermined setting for permitting the predetermined application program to use a location-based service is not set to be enabled in the first information processing apparatus, executing first processing for setting the predetermined setting to be enabled, based on the OS of the first information processing apparatus being the first version and the predetermined setting not being set to be enabled in the first information processing apparatus; after the first processing is executed, executing second processing for predetermined search processing of searching for an access point; and executing third processing for transmitting, to a communication apparatus that has enabled the access point found by the predetermined search processing executed based on the second processing having been executed, information regarding another access point different from the access point enabled by the communication apparatus, and the method of controlling the second information processing apparatus including: executing control based on the OS of the second information processing apparatus being the second version such that the first processing is not executed even in a case where the predetermined setting is not set to be enabled in the second information processing apparatus; executing the second processing; and executing the third processing.

Further features of the present invention will become apparent from the following description of exemplary embodiments with reference to the attached drawings.

DESCRIPTION OF THE EMBODIMENTS

First Embodiment

Information processing apparatuses and a communication apparatus that are included in a communication system according to the present embodiment will be described. In the present embodiment, each of the information processing apparatuses may be, for example, a smartphone. However, the information processing apparatuses are not limited thereto. As each of the information processing apparatuses, various apparatuses such as a terminal apparatus, a laptop PC, a tablet terminal, a personal digital assistant (PDA), and a digital camera can be used. In addition, in the present embodiment, the communication apparatus may be, for example, a printer. However, the communication apparatus is not limited thereto. Various apparatuses can be used as the communication apparatus as long as the apparatuses can wirelessly communicate with the information processing apparatuses. For example, in a case where the communication apparatus is a printer, an ink jet printer, a full-color laser beam printer, a monochrome printer, and the like can be used. Further, in addition to the printers, a copy machine, a facsimile machine, a terminal apparatus, a smartphone, a laptop PC, a tablet terminal, a PDA, a digital camera, a music playing device, a television, a smart speaker, and the like can be used as the communication apparatus. Further, a multi-function peripheral having a plurality of functions including a copy function, a facsimile function, and a print function can be used as the communication apparatus.

First, a system configuration for implementing the present embodiment will be described.

Figure 1:
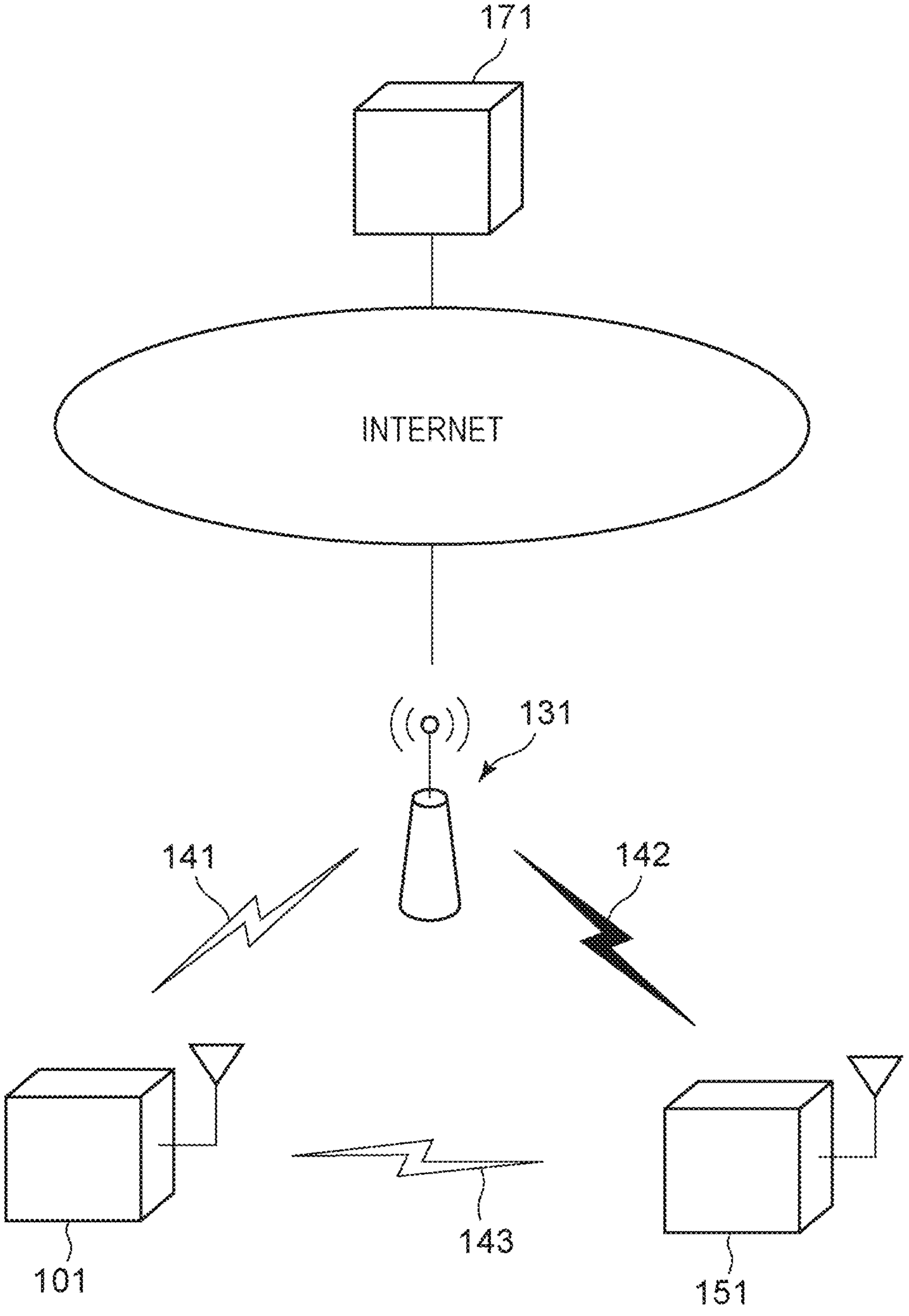
FIG. 1 is a diagram illustrating an example of a communication system according to an embodiment of the present invention.

FIG. 1 is a diagram illustrating an example of the configuration of the communication system according to the present embodiment. The communication system includes a communication apparatus 151, terminal apparatuses 101, an access point (AP) 131, and an external server 171.

The terminal apparatuses 101 are the information processing apparatuses according to the present embodiment. The communication apparatus 151 is the communication apparatus according to the present embodiment. The AP 131 is an external apparatus present outside the terminal apparatuses 101 and the communication apparatus 151. The external server 171 can provide a service through the Internet to the apparatuses connected to the AP 131.

The AP 131, the communication apparatus 151, and the terminal apparatuses 101 are included in a local area network (LAN) formed by the AP 131. The AP 131 and the external server 171 are included in a wide area network (WAN).

In the present embodiment, in a case where an infrastructure connection described later is established, each of the terminal apparatuses 101 can communicate with the communication apparatus 151 via the AP 131. In a case where a direct connection described later is established, the terminal apparatus 101 can directly communicate with the communication apparatus 151 without the AP 131. In the following description, a connection to an AP corresponds to a connection to a network formed by the AP. The AP may concurrently form a plurality of networks. In this case, the connection to the AP may be a connection to any one of the networks formed by the AP.

In the present embodiment, it is assumed that a connection 141 between the terminal apparatus 101 and the AP 131 and a connection 142 between the communication apparatus 151 and the AP 131 are connections by a communication method based on the IEEE802.11 series of standards. Specifically, the communication method based on the IEEE802.11 series of standards is Wireless Fidelity (Wi-Fi) (registered trademark). In the present embodiment, it is assumed that a connection 143 between the terminal apparatus 101 and the communication apparatus 151 is a connection by Wi-Fi or a connection by Bluetooth (registered trademark) Low Energy (BLE).

The communication method used for each of the connections is not limited thereto and may be Bluetooth Classic, Wi-Fi Aware, near-field communication (NFC), or the like. The AP 131 and the external server 171 can communicate with each other via the Internet. In a state in which the AP 131 is connected to the Internet, the Internet is available for use by the apparatuses (terminal apparatus 101 and communication apparatus 151) connected to the AP 131. Each of the connection 141 between the terminal apparatus 101 and the AP 131 and the connection 142 between the communication apparatus 151 and the AP 131 may be a connection by a wired LAN.

Figure 2:
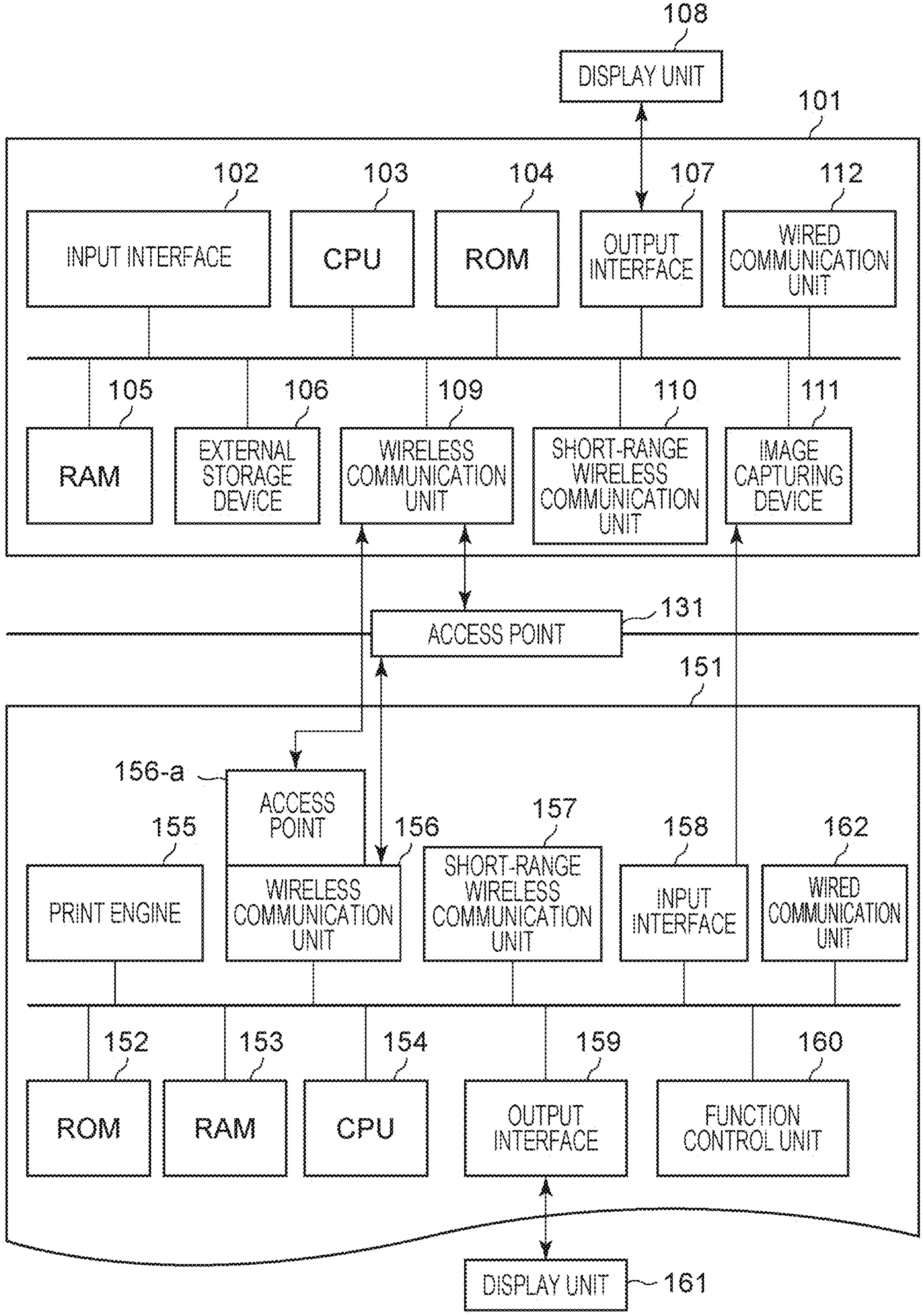
FIG. 2 is a diagram illustrating an example of configurations of a terminal apparatus and a communication apparatus according to a first embodiment of the present invention.

Next, a configuration of the information processing apparatus according to the present embodiment and a configuration of the communication apparatus that can communicate with the information processing apparatus according to the present embodiment will be described with reference to a block diagram of FIG. 2. In the present embodiment, the following configurations are described as an example. However, the present embodiment does not particularly limit functions to functions described with reference to FIG. 2 as long as an apparatus that can communicate with the communication apparatus can be used as the information processing apparatus according to the present embodiment.

Each of the terminal apparatuses 101 includes an input interface 102, a CPU 103, a ROM 104, a RAM 105, an external storage 106, an output interface 107, a display unit 108, a wireless communication unit 109, a short-range wireless communication unit 110, an image capturing device 111, and a wired communication unit 112. The CPU 103, the ROM 104, the RAM 105, and the like form a computer of the terminal apparatus 101. The terminal apparatus 101 is assumed to be a device such as a smartphone, but is not limited to the smartphone.

The input interface 102 receives data input and an operation instruction from a user and includes a physical keyboard, buttons, a touch panel, and the like. The output interface 107 described later and the input interface 102 may be included in the same configuration, and output of a screen and reception of an operation from the user may be performed in the same configuration.

The CPU 103 is a system control unit and controls the entire terminal apparatus 101.

The ROM 104 stores fixed data such as a control program to be executed by the CPU 103, a data table, and an operating system (hereinafter referred to as an OS) program. In the present embodiment, control programs stored in the ROM 104 perform software execution control such as scheduling, task switching, and interruption processing under management by the embedded OS stored in the ROM 104. In the present embodiment, it is assumed that the OS included in the terminal apparatus 101 is MacOS (registered trademark). In the present embodiment, the ROM 104 stores a setup application program (hereinafter referred to as a setup application). The setup application is installed in the terminal apparatus 101 from an external by, for example, a store application program. The setup application is an application provided by a vendor of the communication apparatus 151. The setup application may have other functions other than a function of performing a network setup for the communication apparatus 151. The other functions are, for example, a function of performing a setup other than the network setup for the communication apparatus 151, a function of transmitting a print job for causing the communication apparatus 151 to execute printing, and a function of transmitting a scan job for causing the communication apparatus 151 to execute scanning.

The RAM 105 includes a static random access memory (SRAM) that requires a backup power source. Since data is held in a primary battery (not illustrated) for data backup, important data such as a program control variable can be stored in the RAM 105 without being volatile. In addition, a memory area for storing setting information of the terminal apparatus 101, management data of the terminal apparatus 101, and the like is provided in the RAM 105. The RAM 105 is also used as a main memory and a work memory of the CPU 103.

The external storage 106 includes various programs including a print information generation program for generating print information interpretable by the communication apparatus 151 and an information transmission and reception control program for transmitting and receiving information to and from the communication apparatus 151 connected to the terminal apparatus 101 via the wireless communication unit 109. The external storage 106 stores various types of information that is used by these programs.

The external storage 106 also stores image data acquired from another information processing apparatus and the Internet.

The output interface 107 controls displaying of data by the display unit 108 and notification of the state of the terminal apparatus 101 by the display unit 108.

The display unit 108 includes a light emitting diode (LED) and a liquid crystal display (LCD). The display unit 108 displays data and notifies the state of the terminal apparatus 101. A software keyboard that includes keys including a numeral input key, a mode setting key, a determination key, a cancel key, and a power supply key may be provided on the display unit 108, and the terminal apparatus 101 may receive input from the user via the display unit 108.

The communication unit 109 is wirelessly connected to apparatuses such as the communication apparatus 151 and the AP 131 and is configured to perform data communication with the apparatuses such as the communication apparatus 151 and the AP 131. For example, the communication unit 109 may wirelessly directly communicate with the communication apparatus 151 or may communicate with the communication apparatus 151 via the AP 131 present outside the terminal apparatus 101 and the communication apparatus 151. In the present embodiment, it is assumed that, as a wireless communication method of the wireless communication unit 109, Wi-Fi that is a communication method based on the IEEE802.11 series of standards is used, but Bluetooth Classic or the like may be used. In addition, in the present embodiment, it is assumed that a wireless LAN is a Wi-Fi network. An example of the AP 131 is a device such as a wireless LAN router. In the present embodiment, a method in which the terminal apparatus 101 and the communication apparatus 151 are directly connected to each other without an external AP is referred to as a direct connection method. In the present embodiment, a method in which the terminal apparatus 101 and the communication apparatus 151 are connected to each other via an external AP is referred to as an infrastructure connection method.

The short-range wireless communication unit 110 performs data communication with an apparatus such as the communication apparatus 151 using a short-range wireless communication method and performs the communication using the communication method different from that of the wireless communication unit 109. The short-range wireless communication unit 110 can be connected to a short-range wireless communication unit 157 within the communication apparatus 151. Examples of the communication method of the short-range wireless communication unit 110 are BLE, Bluetooth Classic, Wi-Fi Aware, and NFC.

The image capturing device 111 converts an image captured by an image capturing element into digital data.

The digital data is temporarily stored in the RAM 105. Thereafter, a program executed by the CPU 103 converts the digital data into data in a predetermined image format and stores the converted data as image data to the external storage 106.

The wired communication unit 112 is connected to apparatuses such as the communication apparatus 151 and the AP 131 via a cable or the like and performs data communication with the apparatuses such as the communication apparatus 151 and the AP 131 via the cable or the like. For example, the wired communication unit 112 performs the communication by a wired LAN. In the present embodiment, it is assumed that, in the wired LAN, the communication is performed in accordance with an Ethernet standard. The wired communication unit 112 is not limited thereto. For example, the wired communication unit 112 may perform communication via a Universal Serial Bus (USB) cable.

The communication apparatus 151 includes a ROM 152, a RAM 153, a CPU 154, a print engine 155, a wireless communication unit 156, the short-range wireless communication unit 157, an input interface 158, an output interface 159, a function control unit 160, a display unit 161, a wired communication unit 162, and the like.

The ROM 152, the RAM 153, the CPU 154, and the like form a computer of the communication apparatus 151.

The wireless communication unit 156 is wirelessly connected to apparatuses such as the terminal apparatus 101 and the AP 131 and performs data communication with the apparatuses such as the terminal apparatus 101 and the AP 131. In the present embodiment, it is assumed that Wi-Fi is used as a wireless communication method of the wireless communication unit 156. However, Bluetooth Classic or the like may be used as the wireless communication method of the wireless communication unit 156. The wireless communication unit 156 includes, as an AP within the communication apparatus 151, an AP 156-*a* for connection to an apparatus such as the terminal apparatus 101. The AP 156-*a* can be connected to the wireless communication unit 109 of the terminal apparatus 101. The wireless communication unit 156 may directly communicate with the terminal apparatus 101 via the AP 156-*a* or may communicate with the terminal apparatus 101 via the AP 131. The AP 156-*a* may be hardware that functions as the AP. Alternatively, the wireless communication unit 156 may operate as the AP 156-*a* using software for functioning as the AP. In addition, the AP within the communication apparatus 151 may include a plurality of APs having different service set identifiers (SSIDs) and different passwords. In the present embodiment, it is assumed that the AP included in the communication apparatus 151 includes a connection setting AP described later.

The RAM 153 includes a DRAM or the like that requires a backup power source. Data is held in the RAM 153 by supply of electric power (not illustrated) for data backup. Therefore, important data such as a program control variable can be stored in the RAM 153 without being volatile. In addition, the RAM 153 is used as a main memory and a work memory of the CPU 154 and stores various types of information as a receiving buffer for temporarily storing print information received from the terminal apparatus 101 or the like.

The ROM 152 stores fixed data such as a control program to be executed by the CPU 154, a data table, and an OS program. In the present embodiment, control programs stored in the ROM 152 perform software execution control such as scheduling, task switching, and interruption processing under management by the embedded OS stored in the ROM 152. In addition, the ROM 152 includes a memory area for storing data that is setting information of the communication apparatus 151, management data of the communication apparatus 151, and the like and is required to be held even in a case that electric power is not supplied.

The CPU 154 is a system control unit and controls the entire communication apparatus 151.

The print engine 155 uses a recording material such as ink to form an image on a recording medium such as paper and outputs a print result based on information stored in the RAM 153 and a print job received from the terminal apparatus 101 or the like. In this case, the print job transmitted from the terminal apparatus 101 or the like has a large amount of transmission data, high-speed communication is required, and thus the print job is received via the communication unit 156 that can perform communication at higher speed than the short-range wireless communication unit 157.

The short-range wireless communication unit 157 communicates with an apparatus such as the terminal apparatus 101 using a short-range wireless communication method. Examples of the communication method of the short-range wireless communication unit 157 are BLE, Bluetooth Classic, and Wi-Fi Aware.

The input interface 158 receives data input and an operation instruction from the user and includes a physical keyboard, buttons, a touch panel, and the like. The output interface 159 described later and the input interface 158 may be included in the same configuration, and output of a screen and reception of an operation from the user may be performed in the same configuration. The output interface 159 controls displaying of data by the display unit 161 and notification of the state of the communication apparatus 151 by the display unit 161.

The function control unit 160 manages a function operation of determining whether functions included in the communication apparatus 151 are to be concurrently operated.

The display unit 161 includes a light emitting diode (LED) and a liquid crystal display (LCD). The display unit 161 displays data and notifies the state of the communication apparatus 151. A software keyboard that includes keys including a numeral input key, a mode setting key, a determination key, a cancel key, and a power supply key may be provided on the display unit 161, and the communication apparatus 151 may receive input from the user via the display unit 161.

The wired communication unit 162 is connected to apparatuses such as the terminal apparatus 101 and the AP 131 via a cable or the like and perform data communication with the apparatuses such as the terminal apparatus 101 and the AP 131 via the cable or the like. For example, the wired communication unit 162 performs the communication by a wired LAN. The wired communication unit 162 is not limited thereto and may perform the communication via, for example, a USB cable.

Regarding Direct Connection Method

The direct connection indicates a connection via which the apparatuses are directly wirelessly connected to each other (that is, in a peer-to-peer fashion) without an external apparatus such as the AP 131. The direct connection is also referred to as a peer-to-peer connection (P2P connection). The communication apparatus 151 can operate in a mode (direct connection mode) for communication via the direct connection. In Wi-Fi communication, a plurality of modes for communication via the direct connection, such as a software AP mode and a Wi-Fi Direct (WFD) mode, are present.

The WFD mode is a mode in which the direct connection is performed using WFD. WFD is a standard defined by Wi-Fi Alliance and is included in the IEEE802.11 series of standards. In the WFD mode, after an apparatus as a communication partner is found using an apparatus search command, roles of a P2P group owner (GO) and a P2P client are determined and remaining wireless connection processing is performed. The group owner corresponds to a Wi-Fi master station (parent station), and the client corresponds to a Wi-Fi slave station (child station). The determination of the roles corresponds to P2P GO negotiation. In the WFD mode, before the determination of the roles, the communication apparatus 151 is neither a master station nor a slave station. Specifically, first, one of the apparatuses that will communicate with each other issues an apparatus search command to search for the other apparatus to be connected in the WFD mode. In a case that the other apparatus as a communication partner is found, both the apparatuses check information regarding a service and a function that can be supplied by the apparatuses. The checking of the information to be supplied by the apparatuses is optional and is not necessarily essential. The phase of checking the information to be supplied by the apparatuses corresponds to, for example, P2P provision discovery. Next, after the checking of the information to be supplied by the apparatuses, a P2P client out of the apparatuses and a P2P group owner out of the apparatuses are determined as the roles. After the client and the group owner are determined, parameters for performing communication via WFD are exchanged between the apparatuses. Based on the exchanged parameters, the P2P client and the P2P group owner perform remaining wireless connection processing and IP connection processing. In the WFD mode, the communication apparatus 151 may necessarily operate as the GO without performing the above-described GO negotiation. That is, the communication apparatus 151 may operate in the WFD mode that is an autonomous GO mode. In addition, a state in which the communication apparatus 151 operates in the WFD mode is, for example, a state in which a connection via WFD is not established but the communication apparatus 151 operates as the GO or a state in which a connection via WFD is established and the communication apparatus 151 operates as the GO.

In the software AP mode, one (e.g., the terminal apparatus 101) of apparatuses (e.g., the terminal apparatus 101 and the communication apparatus 151) that communicate with each other serves as a client that plays a role of requesting various services. The other of the apparatuses implements a function of an AP for Wi-Fi by setting software. The software AP corresponds to a Wi-Fi master station, and the client corresponds to a Wi-Fi slave station. In the software AP mode, the client searches for the apparatus serving as the software AP using an apparatus search command. In a case that the software AP is found, the client and the software AP perform remaining wireless connection processing (establishment of a wireless connection and the like). Thereafter, the client and the software AP perform IP connection processing (assignment of an IP address and the like). A command and a parameter that are transmitted and received to implement a wireless connection between the client and the software AP may be defined in the Wi-Fi standards and will not be described.

In the present embodiment, in a case where the communication apparatus 151 establishes and maintains the direct connection, the communication apparatus 151 operates as a master station in a network to which the communication apparatus 151 belongs. The master station is an apparatus that builds a wireless network and provides, to a slave station, a parameter to be used for connection to the wireless network. The parameter to be used for connection to the wireless network is a parameter regarding a channel used by the master station. The slave station receives the parameter and uses the channel used by the master station to connect to the wireless network built by the master station. In the direct connection mode, since the communication apparatus 151 operates as the master station, the communication apparatus 151 can determine which frequency band to use for communication in the direct connection mode, and determine which channel to use for communication in the direct connection mode. In the present embodiment, it is assumed that a channel for the 2.4 GHz frequency band and a channel for the 5 GHz frequency band are available for use by the communication apparatus 151 in communication in the direct connection mode. It is assumed that the user can arbitrarily make a setting on a predetermined screen (not illustrated) displayed by the communication apparatus 151 to set a frequency band to be used (that is, to set a channel for the frequency band to be used). That is, in a case that the 2.4 GHz frequency band is selected on the predetermined screen, the communication apparatus 151 uses a channel for the 2.4 GHz frequency band for communication in the direct connection mode. In a case that the 5 GHz frequency band is selected on the predetermined screen, the communication apparatus 151 uses a channel for the 5 GHz frequency band for communication in the direct connection mode. However, in the present embodiment, it is assumed that even in a case that the 5 GHz frequency band is selected on the predetermined screen, the communication apparatus 151 does not use a channel for a dynamic frequency selection (DFS) band included in the 5 GHz frequency band for communication in the direct connection mode. In other words, it is assumed that the communication apparatus 151 uses only a channel for a frequency band other than the DFS band included in the 5 GHz frequency band for communication in the direct connection mode. In a case that a radar wave in the DFS frequency band corresponding to a channel for the DFS frequency band is detected in a state in which the channel for the DFS frequency band is used, it is necessary to switch the channel currently used. The DFS band is a frequency band for which a channel may be switched due to the detection of a radar wave. For example, in a case where a wireless chip supporting a DFS function is used or the like, a channel for the dynamic frequency selection (DFS) band included in the 5 GHz frequency band may be usable for communication in the direct connection mode. A channel determined as a channel to be used in the direct connection mode is used for communication via the direct connection. The channel is also used for transmission of a beacon signal as the master station, transmission of a response to a received command, and the like. That is, the channel is used for not only communication processing in the direct connection mode in a state in which the direct connection is established but also communication processing in the direct connection mode in a state in which the direct connection is not established.

Although the 2.4 GHz frequency band and the 5 GHz frequency band are available for use by the communication apparatus 151, the communication apparatus 151 is not limited thereto and may be able to use another frequency band. In the present embodiment, in processing for which the 2.4 GHz frequency band and the 5 GHz frequency band are used, another frequency band may be used. For example, since the 60 GHz frequency band is available in the IEEE802.11ad, the 60 GHz frequency band may be used as the other frequency band.

Regarding Infrastructure Connection Method

In the infrastructure connection, apparatuses (e.g., the terminal apparatus 101 and the communication apparatus 151) that communicate with each other are connected to an AP (e.g., the AP 131) that controls a network to which the apparatuses belong, and communicate with each other via the AP. The communication apparatus 151 can operate in the mode (infrastructure connection mode) for communication via the infrastructure connection as one of connection modes.

In the infrastructure connection, each of the apparatuses searches for the AP using an apparatus search command. In a case that the AP is found, the apparatuses and the AP perform remaining wireless connection processing (establishment of a wireless connection and the like). Thereafter, the apparatuses and the AP perform IP connection processing (assignment of an IP address and the like). A command and a parameter that are transmitted and received to implement the wireless connection between the apparatuses and the AP may be defined in the Wi-Fi standards and will not be described.

In the present embodiment, in a case that the communication apparatus 151 operates in a state in which the communication apparatus 151 establishes the infrastructure connection, the AP 131 operates as a master station and the communication apparatus 151 operates as a slave station. That is, in the present embodiment, the infrastructure connection indicates a connection between the communication apparatus 151 operating as the slave station and the apparatus operating as the master station. In a case that the communication apparatus 151 establishes the infrastructure connection and the terminal apparatus 101 establishes an infrastructure connection to the AP 131, the communication apparatus 151 and the terminal apparatus 101 can communicate with each other via the AP 131. Since a channel used for communication via the infrastructure connection is determined by the AP 131, the communication apparatus 151 uses the channel determined by the AP 131 to perform communication via the infrastructure connection. In the present embodiment, it is assumed that a channel for the 2.4 GHz frequency band and a channel for the 5 GHz frequency band are available for use by the communication apparatus 151 in the communication via the infrastructure connection. A channel for the DFS band included in the 5 GHz frequency band is also available for use by the communication apparatus 151 in the communication via the infrastructure connection. To communicate with the communication apparatus 151 via the AP 131, the terminal apparatus 101 needs to recognize that the communication apparatus 151 belongs to the network that is formed by the AP 131 and to which the terminal apparatus 101 belongs.

Regarding Connection Setting Mode

In the present embodiment, the terminal apparatus 101 executes a connection setting process on the communication apparatus 151. The connection setting process is a process for establishing a connection between the communication apparatus 151 and another apparatus by Wi-Fi. The communication apparatus 151 is operable in a connection setting mode as a mode for the connection setting process. A trigger for the communication apparatus 151 to start to operate in the connection setting mode may be pressing of a connection setting mode button by a user or may be the first activation (power on) of the communication apparatus 151 after arrival of the communication apparatus 151. The connection setting mode button may be a hardware button included in the communication apparatus 151 or may be a software button displayed on the display unit 161 by the communication apparatus 151.

Upon starting operating in the connection setting mode, the communication apparatus 151 enables Wi-Fi communication and BLE communication. Specifically, as processing of enabling the Wi-Fi communication, the communication apparatus 151 enables the AP (connection setting AP) included in the communication apparatus 151 and dedicated for the connection setting mode. Therefore, the communication apparatus 151 can establish the direct connection to the terminal apparatus 101 by Wi-Fi. It is assumed that connection information (an SSID and a password) for connection to the connection setting AP is held in the setup application installed in the terminal apparatus 101 and that the terminal apparatus 101 recognizes the connection information for connection to the connection setting AP in advance. An encryption method may not be set in the connection setting AP and a password may not be necessary for connection to the connection setting AP. Therefore, it is assumed that the connection information for connection to the connection setting AP cannot be arbitrarily changed by the user, unlike connection information of an AP enabled in the direct connection mode. In the connection setting mode, the communication apparatus 151 may be connected to the terminal apparatus 101 by Wi-Fi Direct (WFD) instead of normal Wi-Fi. That is, the communication apparatus 151 may operate as a group owner and receive a setting command from the terminal apparatus 101 via communication by WFD.

Regarding Issues to be Solved in Present Embodiment

In the present embodiment, to execute the connection setting process on the communication apparatus 151, it is necessary that the terminal apparatus 101 search for the communication apparatus 151 operating in the connection setting mode and connect to the communication apparatus 151 found in the search. Specifically, the search for the communication apparatus 151 operating in the connection setting mode is executed by processing of searching for an access point present around the terminal apparatus 101 by a communication method based on the IEEE 802.11 standards. More specifically, the setup application on the terminal apparatus 101 executes an OS standard application programming interface (API) for instructing the OS to execute processing (hereinafter referred to as first search processing) of searching for the access point present around the terminal apparatus 101, thereby causing the OS to execute the first search processing. The OS standard API for instructing the OS to execute the first search processing is hereinafter referred to as a first search API. In the first search processing, the OS attempts to receive a beacon issued by the access point present around the terminal apparatus 101. Therefore, any of beacons is received and the access point that issues the received beacon is found. The setup application that has executed the first search API acquires information regarding the access point found by the first search processing as information indicating a result of the first search processing. Therefore, the setup application can recognize the access point present around the terminal apparatus 101 and found by the search executed by the terminal apparatus 101. In a case where a communication apparatus has enabled the access point, the communication apparatus that has enabled the access point may be found by the first search processing. Therefore, the setup application can find the communication apparatus 151 that is operating in the connection setting mode and thus has enabled the access point, and can establish a connection between the terminal apparatus 101 and the communication apparatus 151 operating in the connection setting mode.

However, even in a case that the setup application executes the first search API, the first search processing may not be executed by the OS. Specifically, in a case where the OS of the terminal apparatus 101 is a predetermined version or higher, and a setting item regarding a location-based service managed by the OS of the terminal apparatus 101 is not set to predetermined contents, even in a case that the setup application executes the first search API, the first search processing is not executed by the OS. The location-based service is a service for an application to use information provided by the OS of the terminal apparatus 101 and indicating the position of the terminal apparatus 101. In the location-based service, the position of the terminal apparatus 101 is specified based on, for example, information acquired from a global positioning system (GPS), an access point, a telephone base station, or the like. In addition, the OS of the predetermined version or higher is specifically MacOS 14. Further, an OS of a version lower than the predetermined version is, in other words, an OS of a version older than the predetermined version and is, for example, MacOS 13. The predetermined contents are, for example, contents in which a setting (hereinafter referred to as a first setting) for permitting an application included in the terminal apparatus 101 to use the location-based service is set to be enabled and a setting (hereinafter referred to as a second setting) for selecting the setup application as the application permitted by the first setting to use the location-based service is set to be enabled. There is an issue that in a case where the first search processing is not executed by the OS, the terminal apparatus 101 cannot find the communication apparatus 151 operating in the connection setting mode and cannot execute the connection setting process on the communication apparatus 151.

Therefore, in the present embodiment, in a state in which the first search processing is not executed by the OS even in a case that the setup application executes the first search API, processing for executing control such that the first search processing is executed by the OS based on the first search API having been executed by the setup application is executed. Therefore, it is possible to suppress the occurrence of a situation in which the connection setting process cannot be executed, and it is possible to improve the usability in the setup application.

Regarding Screen for Setting Regarding Location-Based Service

Figure 3:
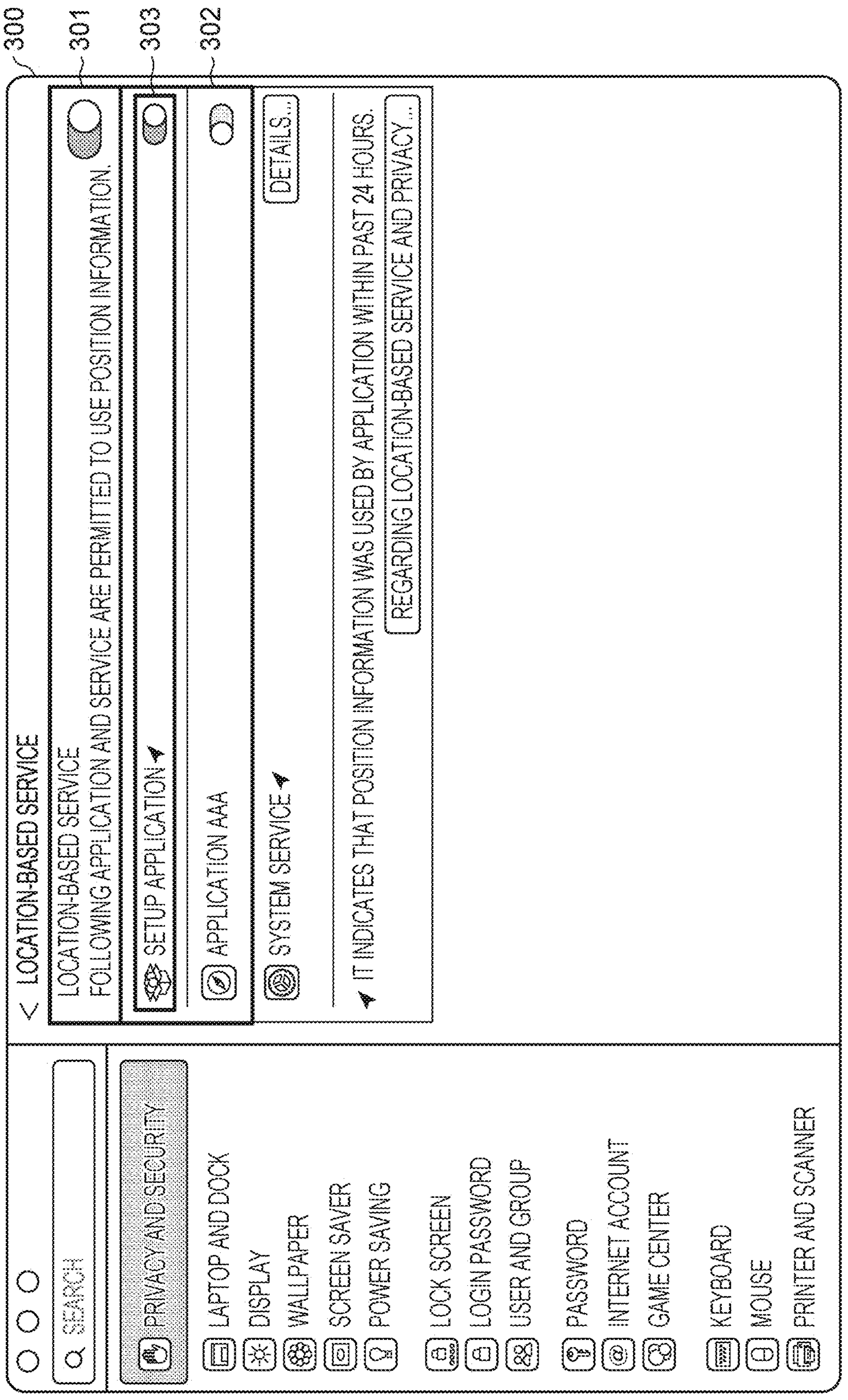
FIG. 3 is a diagram illustrating an example of a setting screen displayed in the first embodiment of the present invention.

An OS standard setting application included in the terminal apparatus 101 can display a setting screen 300 as illustrated in FIG. 3. The setting screen 300 is displayed in a window displayed by the OS standard setting application. In the setting screen 300, a region 301 is a region for enabling or disabling the first setting. The region 301 includes a first toggle button. The first setting is enabled or disabled by operating the first toggle button. In a case where the first setting is enabled, the location-based service is available for use by an application selected as an application permitted by the first setting to use the location-based service. Even in a case where the first setting is enabled, the location-based service is not available for use by an application that is not selected as an application permitted by the first setting to use the location-based service. On the other hand, in a case where the first setting is disabled, the location-based service is not available for use by all applications included in the terminal apparatus 101. In a case where the first setting is disabled, a region 302 described below may be grayed out and an operation on the region 302 may be disabled. In addition, in a case where the first setting is disabled, all settings settable in the region 302 may be disabled.

The region 302 is a region for selecting another application other than the OS standard setting application as an application permitted by the first setting to use the location-based service. In the present embodiment, the region 302 includes a region 303 for enabling or disabling the second setting. The region 303 includes a second toggle button. The second setting is enabled or disabled by operating the second toggle button. In a case where the second setting is enabled, the setup application is selected as an application permitted by the first setting to use the location-based service, and the location-based service is available for use by the setup application. On the other hand, in a case where the second setting is disabled, the setup application is not selected as an application permitted by the first setting to use the location-based service, and the location-based service is not available for use by the setup application. The region 302 may include a region regarding an application other than the setup application and similar to the region 303.

Regarding Process Executed by Terminal Apparatus 101 in Present Embodiment

Figure 4:
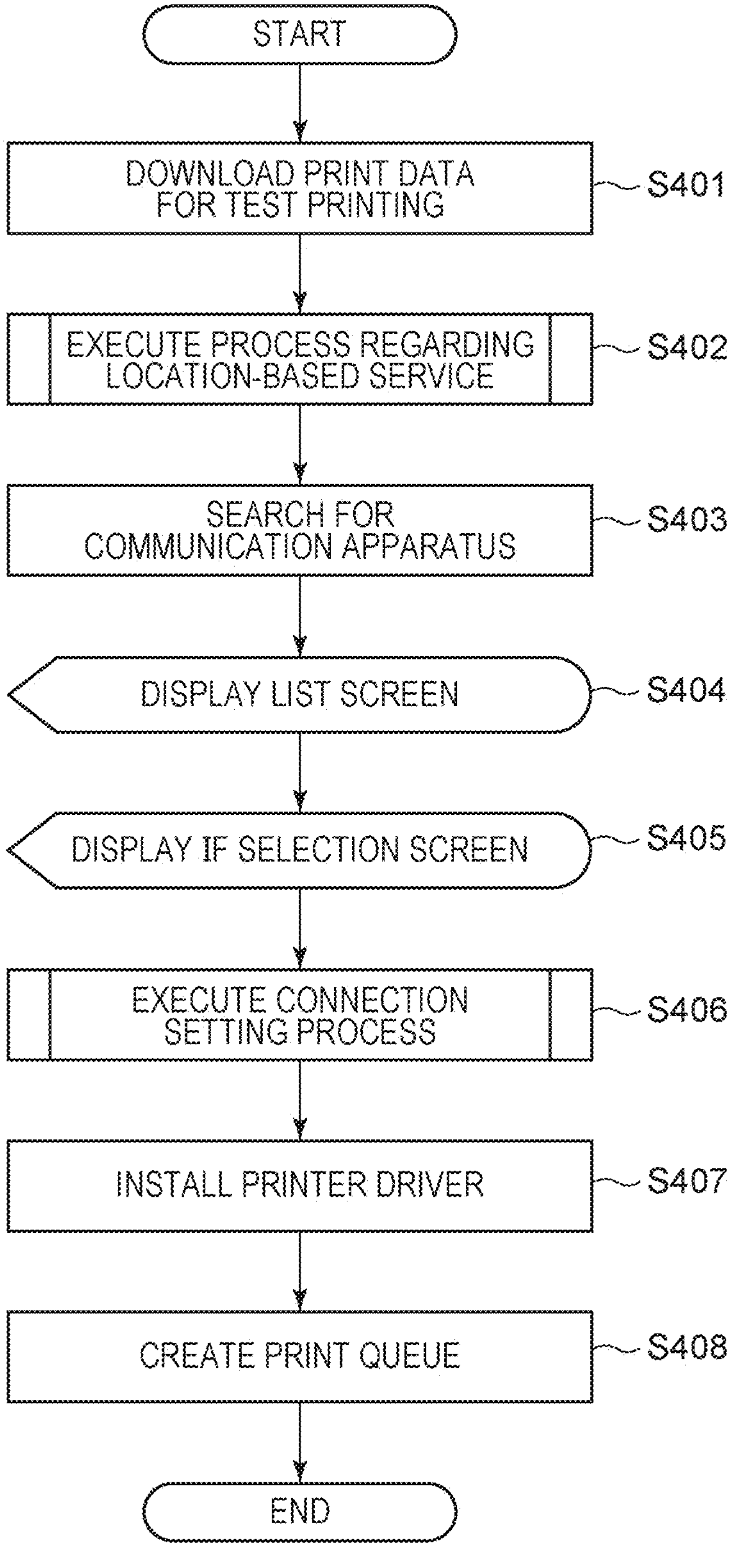
FIG. 4 is a flowchart illustrating a process executed by terminal apparatuses by using a setup application according to the first embodiment of the present invention.

FIG. 4 is a flowchart illustrating a process executed by the terminal apparatus 101 by using the setup application. The flowchart in FIG. 4 is implemented by the CPU 103 reading the program (setup application) stored in the ROM 104 into the RAM 105 and executing the read program.

It is assumed that the flowchart in FIG. 4 is started based on an operation having been performed for activating the setup application. The operation for activating the setup application is, for example, an operation of pressing an icon associated with the setup application and displayed on a home screen of the terminal apparatus 101.

In S401, the CPU 103 downloads print data for test printing described later. The print data is, for example, acquired from a server on the Internet via a connection between the terminal apparatus 101 and an access point.

In S402, a process regarding the location-based service is executed. This process will be described below in detail with reference to FIG. 5.

Figure 5:
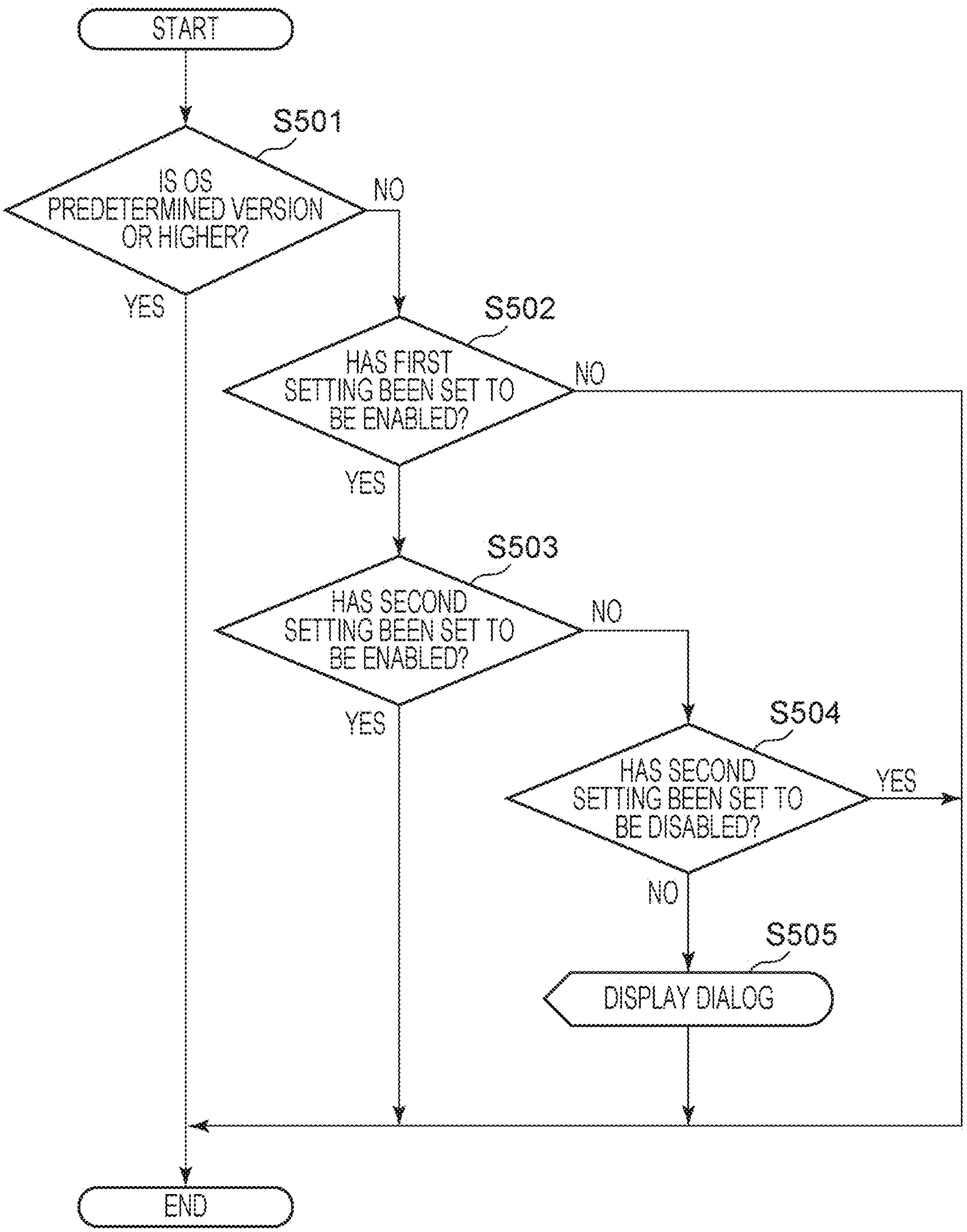
FIG. 5 is a flowchart illustrating a process regarding a location-based service according to the first embodiment of the present invention.

FIG. 5 is a flowchart illustrating the process regarding the location-based service. The flowchart in FIG. 5 is implemented by the CPU 103 reading a program stored in the ROM 104 into the RAM 105 and executing the read program. In the present embodiment, it is assumed that the terminal apparatus 101 executes the process by the setup application. The process of the flowchart in FIG. 5 corresponds to the process in S402.

In S501, the CPU 103 determines whether the OS of the terminal apparatus 101 is the predetermined version or higher. In the present embodiment, the predetermined version is MacOS 14 but is not limited thereto. It suffices for the OS of the terminal apparatus 101 to be of an OS version in which setting contents of the location-based service are included in a condition for executing the first search processing by the OS. In a case that the CPU 103 determines YES in S501, the CPU 103 proceeds to S502. In a case that the CPU 103 determines NO in S501, the CPU 103 ends the process of the flowchart in FIG. 5 and proceeds to S403. That is, in a case that the CPU 103 determines NO in S501, the CPU 103 proceeds to S403 without executing S502 to S505 described later and executes control such that processing (processing in S505) for setting the second setting to be enabled is not executed even in a case where the second setting is not set to be enabled. That is, in a case where the CPU 103 determines NO in S501, the CPU 103 executes control regardless of the setting contents of the second setting such that the processing for setting the second setting to be enabled is not executed. It is assumed that the OS of the terminal apparatus 101 can be updated from an OS of a version lower than the predetermined version to an OS of the predetermined version or higher. In this case, the setup application on the single terminal apparatus 101 may output the result of the determination in S501 indicating YES or NO. That is, in a case that the determination is executed in S501 before an update of the OS, the setup application on the single terminal apparatus 101 outputs the result of the determination in S501 indicating NO. In a case that the determination is executed in S501 after the update of the OS, the setup application on the single terminal apparatus 101 outputs the result of the determination in S501 indicating YES. However, in a form in which the OS included in the terminal apparatus 101 cannot be updated, the setup application on the single terminal apparatus 101 outputs the result of the determination in S501 indicating only YES or NO. That is, the terminal apparatus 101 in which the setup application is executed in a case where the result of the determination in S501 indicates YES is different from the terminal apparatus 101 in which the setup application is executed in a case where the result of the determination in S501 indicates NO.

In S502, the CPU 103 determines whether the first setting has been set to be enabled. As described above, in the first setting, the setting contents may be changed due to an operation on the region 301 illustrated in FIG. 3. Specifically, in the processing in S502, the CPU 103 executes, by the setup application, an OS standard API for acquiring, from the OS, information indicating whether the first setting has been set to be enabled, thereby acquiring the information from the OS by the setup application.

Then, the CPU 103 executes the determination in S502 based on whether the acquired information indicates whether the first setting has been enabled. In a case that the CPU 103 determines YES in S502, the CPU 103 proceeds to S503. In a case where the CPU 103 determines NO in S502, the CPU 103 ends the process of the flowchart in FIG. 5 and proceeds to S403.

In S503, the CPU 103 determines whether the second setting has been set to be enabled. As described above, in the second setting, the setting contents may be changed due to an operation on the region 303 illustrated in FIG. 3. In the present embodiment, it is assumed that states regarding the second setting include a state in which the second setting is set to be enabled, a state in which the second setting is set to be disabled, and a state (hereinafter referred to as an initial state) in which the second setting is not set to be enabled and not set to be disabled. The initial state corresponds to a state in which an operation of setting the second setting to be enabled and an operation of setting the second setting to be disabled are not executed. In the state in which the second setting is set to be enabled or the state in which the second setting is set to be disabled, the region 303 is displayed in the region 302 when the screen 300 is opened. In the initial state, the region 303 may not be displayed in the region 302 when the screen 300 is opened. That is, in the region 302, only a region regarding an application set to be enabled or disabled as an application permitted by the first setting to use the location-based service may be displayed due to a dialog described later. Specifically, in the processing in S503, the CPU 103 executes, by the setup application, an OS standard API for acquiring, from the OS, information indicating which state the state regarding the second setting is, thereby acquire the information from the OS by the setup application. Then, the CPU 103 executes the determination in S503 based on whether the acquired information indicates the state in which the second setting is set to be enabled. In a case that the CPU 103 determines YES in S503, the CPU 103 ends the process of the flowchart in FIG. 5 and proceeds to S403. In a case that the CPU 103 determines NO in S503, the CPU 103 proceeds to S504. In a case where the acquired information indicates the initial state or the state in which the second setting is set to be disabled, the CPU 103 determines NO in S503.

In S504, the CPU 103 determines whether the second setting has been set to be disabled. In a case that the CPU 103 determines YES in S504, the CPU 103 ends the process of the flowchart in FIG. 5 and proceeds to S403. In a case that the CPU 103 determines NO in S504, the CPU 103 proceeds to S505. In a case where the information acquired in S503 indicates the initial state, the CPU 103 determines NO in S504.

Figure 6:
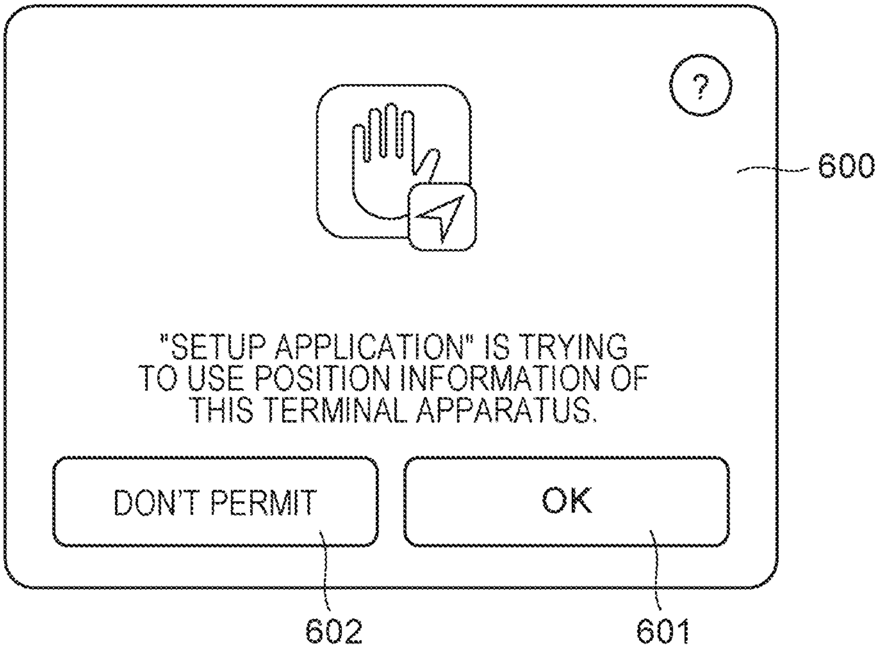
FIG. 6 is a diagram illustrating an example of a dialog displayed in the first embodiment of the present invention.

In S505, the CPU 103 executes processing for enabling the second setting. Specifically, in the processing in S505, the CPU 103 executes, by the setup application, an OS standard API for displaying a dialog for enabling the second setting. When the API is executed, the OS displays the dialog in a window displayed by the setup application. FIG. 6 illustrates an example of the dialog 600 displayed in the processing in S505. The dialog 600 includes a button 601 for enabling the second setting and a button 602 for not enabling the second setting. The dialog 600 also includes a message indicating that the setup application is trying to use the location-based service. The contents of the message are controlled by the OS and cannot be controlled by the setup application. However, in the dialog 600, a message that can be controlled by the setup application can be displayed. Specifically, in a case that the OS standard API for displaying the dialog 600 is executed, the setup application may notify the OS of any message as an argument and the message may be displayed in the dialog 600. In a case that the setup application does not notify the OS of the message as an argument, the message controlled by the setup application is not displayed in the dialog 600. As the message controlled by the setup application, for example, a message indicating that it is necessary to set the second setting to be enabled in order to execute the connection setting process on the communication apparatus 151 may be displayed in the dialog 600. In a case that the button 601 is operated by a user, the OS enables the second setting. That is, the OS sets the state regarding the second setting to the state in which the second setting is set to be enabled. In addition, the OS notifies the setup application that the button 601 has been operated by the user. Meanwhile, in a case that the button 602 is operated by the user, the OS disables the second setting. That is, the OS sets the state regarding the second setting to the state in which the second state is set to be disabled. In addition, the OS notifies the setup application that the button 602 has been operated by the user. In a case that the button 601 or the button 602 is operated, the dialog is hidden. In a case that the button 601 or the button 602 is operated, the CPU 103 ends the process of the flowchart in FIG. 5 and proceeds to S403.

In the present embodiment, in a case where the second setting is not in the initial state, the OS does not display the dialog 600. In other words, in a case where the second setting is set to be disabled, even in a case that the OS standard API for displaying the dialog 600 is executed by the setup application, the OS does not display the dialog 600. Therefore, in the present embodiment, only in a case where the second setting is in the initial state, the processing for enabling the second setting is executed. However, the present embodiment is not limited thereto. Even in a case where the second setting is set to be disabled, the OS may be able to display the dialog 600. The determination in S504 may be omitted and the processing for enabling the second setting may be executed in a case where the second setting is in the initial state and in a case where the second setting is set to be disabled.

When the process of the flowchart in FIG. 5 ends, the CPU 103 proceeds to S403.

In S403, the CPU 103 executes processing for searching for the communication apparatus 151. Specifically, in the processing in S403, the CPU 103 executes the first search API, thereby instructing the OS to execute the first search processing. In a case where the OS of the terminal apparatus 101 is the predetermined version or higher and both the first setting and the second setting are set to be enabled, when the first search API is executed, the first search processing is executed by the OS. In a case where the OS of the terminal apparatus 101 is a version lower than the predetermined version, the first search processing is executed by the OS regardless of setting contents of the first setting and the second setting. However, in a case where the OS of the terminal apparatus 101 is the predetermined version or higher and at least one of the first setting and the second setting is set to be disabled, even in a case that the first search API is executed by the setup application, the first search processing is not executed by the OS. In a case that the first search processing is executed by the OS, the setup application acquires, from the OS, information indicating a result of the first search processing. In a case that the first search processing is not executed by the OS, the setup application does not acquire, from the OS, information indicating a result of the first search processing. In the processing in S403, the CPU 103 executes an OS standard API (hereinafter referred to as a second search API) for instructing the OS to execute processing (hereinafter referred to as second search processing) of searching for a communication apparatus on a network to which the terminal apparatus 101 belongs, thereby causing the OS to execute the second search processing. In a case that the second search API is executed, the second search processing is executed by the OS regardless of the version of the OS of the terminal apparatus 101 and the setting contents of the first setting and the second setting. That is, even in a case where the OS of the terminal apparatus 101 is the predetermined version or higher, and at least one of the first setting and the second setting is set to be disabled, the second search processing is executed by the OS. In a case that the second search processing is executed by the OS, the setup application acquires, from the OS, information indicating a result of the second search processing. The second search processing is, in other words, processing of searching for a communication apparatus belonging to a network to which the terminal apparatus 101 belongs. The second search processing is executed by broadcasting on the network to which the terminal apparatus 101 belongs. The communication apparatus belonging to the network to which the terminal apparatus 101 belongs is, in other words, a communication apparatus connected to an access point to which the terminal apparatus 101 connects. The connection between the terminal apparatus 101 and the access point is established by a communication method based on the IEEE 802.11 standards or a wired LAN. In a case where a plurality of communication apparatuses belonging to the network to which the terminal apparatus 101 belongs are present, the plurality of communication apparatuses belonging to the network to which the terminal apparatus 101 belongs are found by the second search processing.

Figure 7:
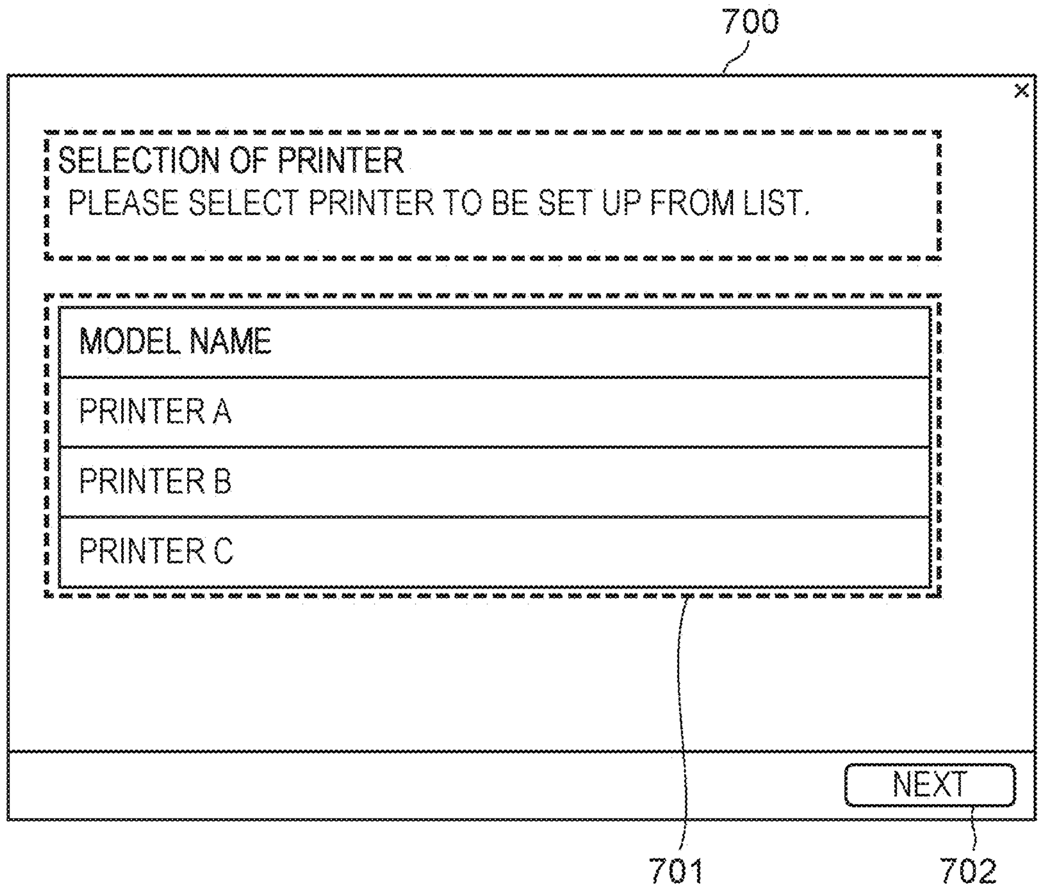
FIG. 7 is a diagram illustrating an example of a list screen displayed in the first embodiment of the present invention.

In S404, the CPU 103 displays a list of one or more communication apparatuses found by the search processing executed in S403. In this case, the CPU 103 may specify a communication apparatus supported by the setup application among the one or more communication apparatuses found by the search processing executed in S403, and display only the specified communication apparatus. Specifically, in the present embodiment, the communication apparatus supported by the setup application is a printing apparatus provided by the vendor that provides the setup application. In addition, specifically, the communication apparatus supported by the setup application is a communication apparatus that is operating in the connection setting mode and has enabled an access point having an SSID dedicated for the connection setting mode. FIG. 7 illustrates an example of a list screen 700 that is a screen displayed in the processing in S404. A region 701 is a region indicating the list of the one or more communication apparatuses found by the search processing executed in S403. Since any one of the one or more communication apparatuses is selected by the user from the list displayed in the region 701, it can be said that the list screen 700 is a selection screen. In a case that a region 702 is operated after any one of the one or more communication apparatuses is selected by the user from the list displayed in the region 701, the CPU 103 proceeds to S405.

Figure 8:
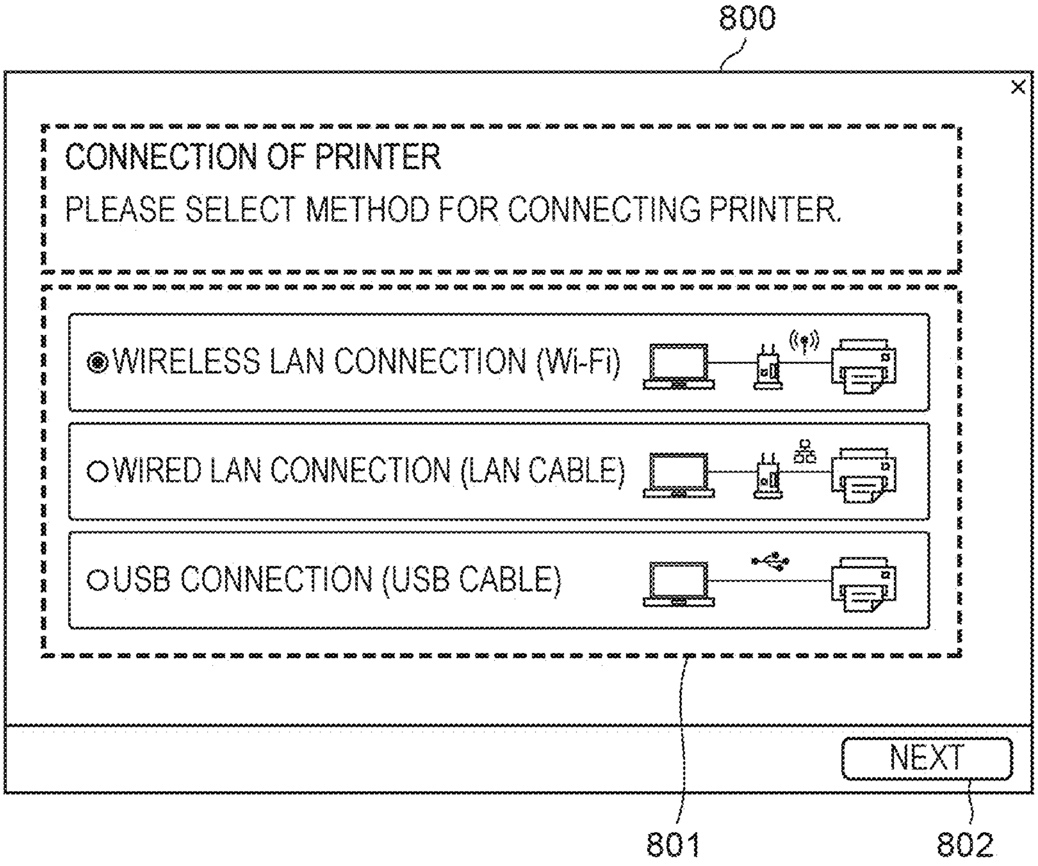
FIG. 8 is a diagram illustrating an IF selection screen displayed in the first embodiment of the present invention.

In S405, the CPU 103 displays an IF selection screen for selecting an interface (IF) to be used for the connection setting process. FIG. 8 illustrates an example of the IF selection screen 800 that is the screen displayed in the processing in S405. In a region 801, candidates for an IF to be used for the connection setting process are displayed. In the present embodiment, it is assumed that the candidates for the IF to be used for the connection setting process are an IF for wireless LAN communication (Wi-Fi communication), an IF for wired LAN communication, and an IF for USB communication. The IF selected in this case is an IF to be used for a connection between the communication apparatus selected in S404 and the terminal apparatus 101, and thus it can be said that the IF selection screen is a screen for selecting a method for the connection between the communication apparatus selected in S404 and the terminal apparatus 101. In a case that a region 802 is operated by the user after any one of the candidates displayed in the region 801 is selected by the user, the CPU 103 proceeds to S406.

In S406, the CPU 103 executes the connection setting process on the communication apparatus selected in S404. This process will be described below in detail with reference to FIG. 9.

Figure 9:
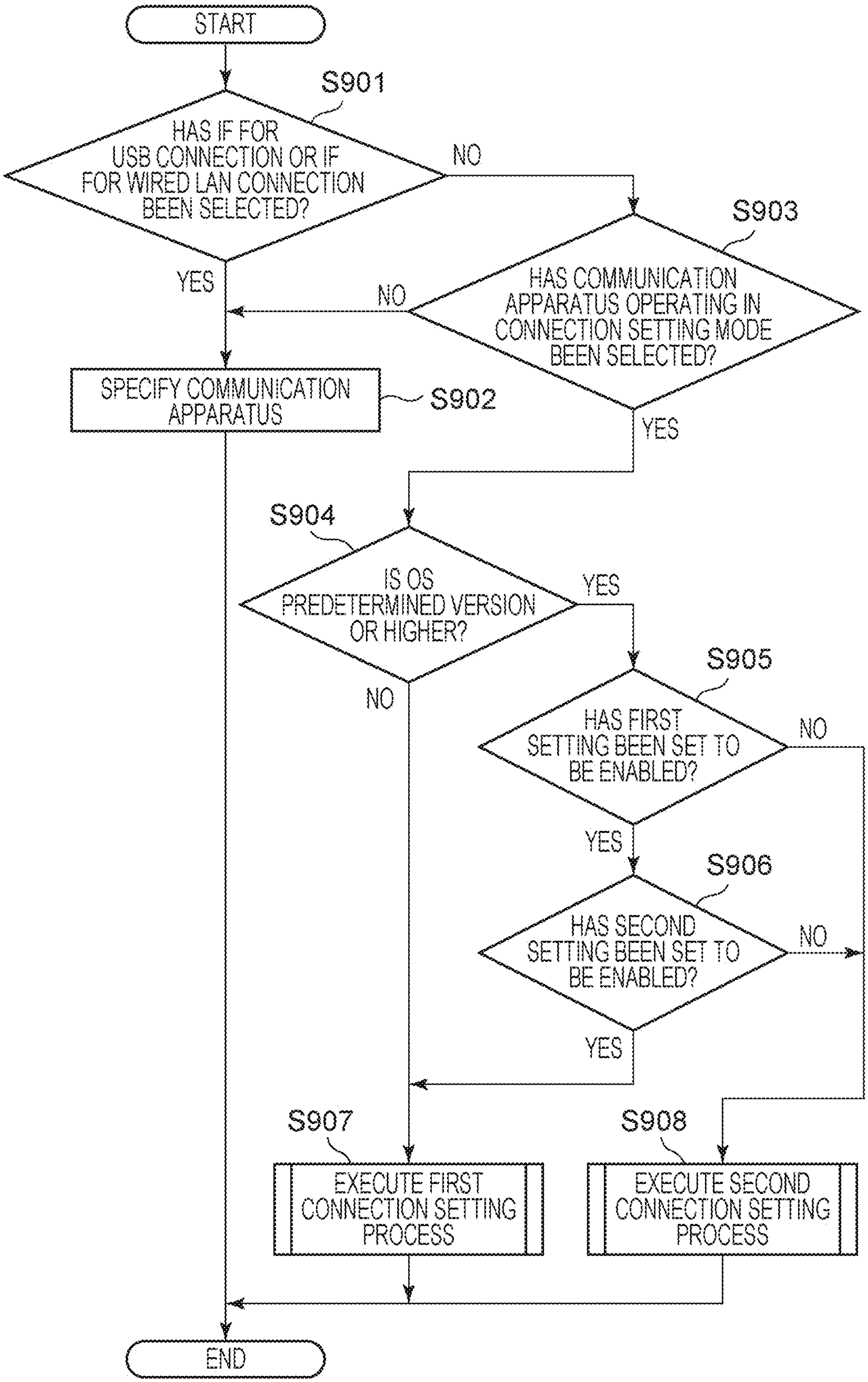
FIG. 9 is a flowchart illustrating a connection setting process according to the first embodiment of the present invention.

FIG. 9 is a flowchart illustrating the connection setting process. The flowchart in FIG. 9 is implemented by the CPU 103 reading a program stored in the ROM 104 into the RAM 105 and executing the read program. In the present embodiment, it is assumed that the terminal apparatus 101 executes the process by the setup application. The process of the flowchart in FIG. 9 corresponds to the process in S406.

In S901, the CPU 103 determines whether the IF selected in S405 is an IF for wired LAN communication or an IF for USB communication. In a case that the CPU 103 determines YES in S901, the CPU 103 proceeds to S902. In a case that the CPU 103 determines NO in S901, the CPU 103 proceeds to S903. In a case that the IF selected in S405 is an IF for wireless LAN communication, the CPU 103 determines NO in S901.

In S902, the CPU 103 specifies the communication apparatus 151 connected to the terminal apparatus 101 by the IF selected in S405 and selected in S404, and establishes a session between the specified communication apparatus 151 and the terminal apparatus 101. Therefore, the terminal apparatus 101 enters into a state in which the terminal apparatus 101 can communicate with the specified communication apparatus 151. After S902, the CPU 103 ends the process of the flowchart in FIG. 9 and proceeds to S407.

In S903, the CPU 103 determines whether the communication apparatus 151 selected in S404 is a communication apparatus 151 found by the first search processing. The communication apparatus 151 found by the first search processing is a communication apparatus 151 operating in the connection setting mode. In a case that the CPU 103 determines YES in S903, the CPU 103 proceeds to S904. In a case that the CPU 103 determines NO in S903, the CPU 103 proceeds to S902.

In S904, the CPU 103 determines whether the OS of the terminal apparatus 101 is the predetermined version or higher. The processing in S904 is the same as or similar to the processing in S501. In a case that the CPU 103 determines YES in S904, the CPU 103 proceeds to S905. In a case that the CPU 103 determines NO in S904, the CPU 103 proceeds to S907. That is, in a case that the CPU 103 determines NO in S904, the CPU 103 proceeds to S907 without executing S905, S906, and S908 and executes control such that a second connection setting process is not executed even in a case where both the first setting and the second setting are not set to be enabled. That is, in a case that the CPU 103 determines NO in S904, the CPU 103 executes control regardless of the setting contents of the first setting and the second setting such that the second connection setting process is not executed.

In S905, the CPU 103 determines whether the first setting has been set to be enabled.

The processing in S905 is the same as or similar to the processing in S502. In a case that the CPU 103 determines YES in S905, the CPU 103 proceeds to S906. In a case that the CPU 103 determines NO in S905, the CPU 103 proceeds to S908.

In S906, the CPU 103 determines whether the second setting has been set to be enabled.

The processing in S906 is the same as or similar to the processing in S503. In a case that the CPU 103 determines YES in S906, the CPU 103 proceeds to S907. In a case that the CPU 103 determines NO in S906, the CPU 103 proceeds to S908.

In S907, the CPU 103 executes a first connection setting process. The process in S907 will be described later in detail with reference to FIG. 10. After S907, the CPU 103 ends the process of the flowchart in FIG. 9 and proceeds to $407.

In S908, the CPU 103 executes the second connection setting process. The process in S908 will be described later in detail with reference to FIG. 11. After S908, the CPU 103 ends the process of the flowchart in FIG. 9 and proceeds to S407.

Figure 10:
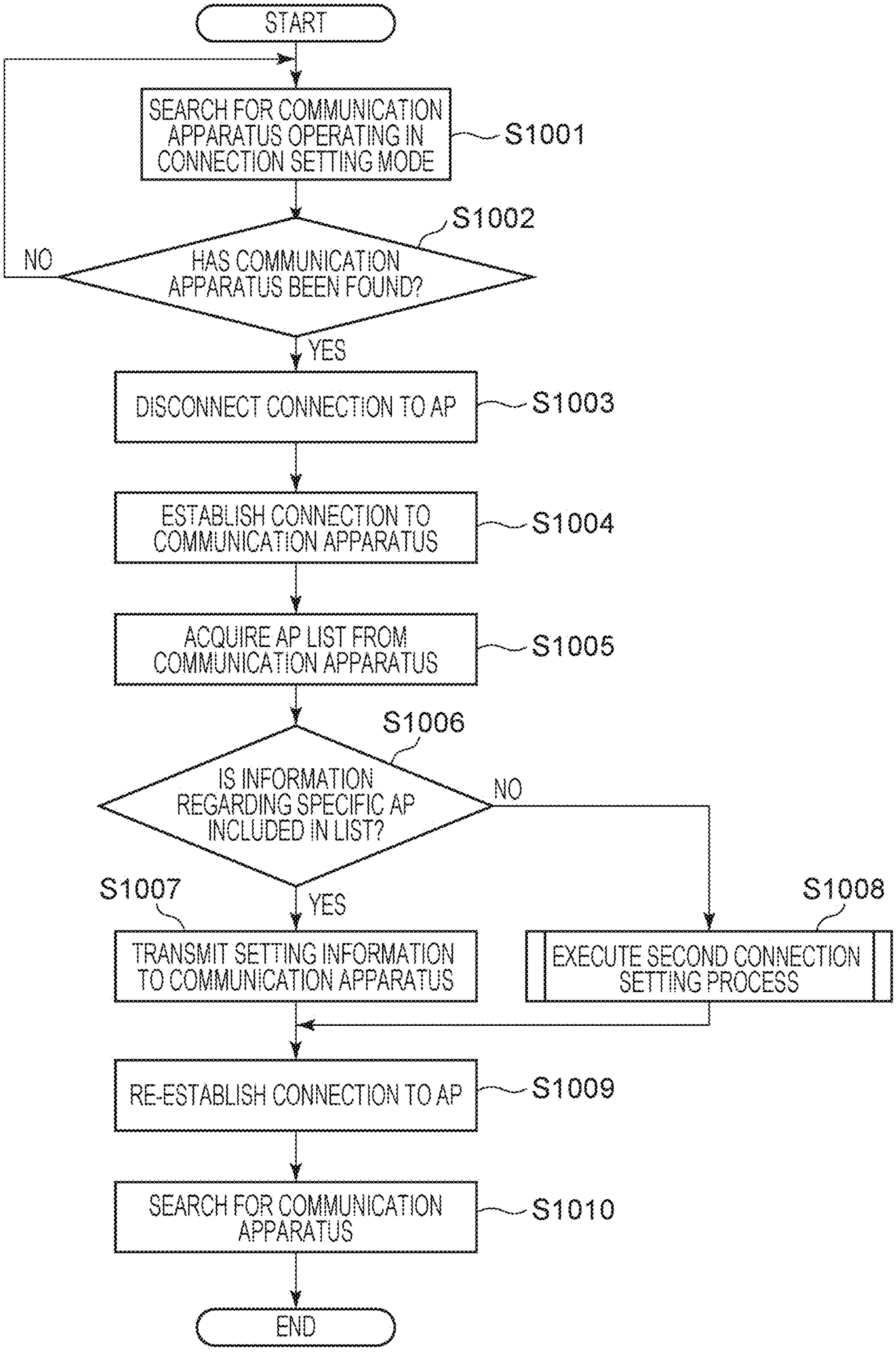
FIG. 10 is a flowchart illustrating a first connection setting process according to the first embodiment of the present invention.

The first connection setting process will be described below in detail. FIG. 10 is a flowchart illustrating the first connection setting process. The flowchart in FIG. 10 is implemented by the CPU 103 reading a program stored in the ROM 104 into the RAM 105 and executing the read program. In the present embodiment, it is assumed that the terminal apparatus 101 executes the process by the setup application. The process of the flowchart in FIG. 9 corresponds to the process in S907.

In S1001, the CPU 103 searches for the communication apparatus 151 operating in the connection setting mode and selected in S404. Specifically, in the processing in S1001, the CPU 103 executes the first search API, thereby instructing the OS to execute the first search processing. Since a case where the first connection setting process is executed is a case where the condition for executing the first search processing is satisfied, there is no possibility that the first search processing is not executed by the OS even though the first search API has been executed. In a case that the first search processing is executed by the OS, the setup application acquires, from the OS, information indicating a result of the first search processing. The information indicating the result of the first search processing is information indicating one or more access points found by the first search processing. Therefore, the CPU 103 specifies the access point enabled by the communication apparatus 151 operating in the connection setting mode and selected in S404 from among the one or more access points found by the first search processing. In a case that the access point is specified, the communication apparatus 151 operating in the connection setting mode and selected in S404 is found in the processing in S1001. In a case that the access point is not specified, the communication apparatus 151 operating in the connection setting mode and selected in S404 is not found in the processing in S1001.

In S1002, the CPU 103 determines whether the communication apparatus 151 selected in S404 has been found by the search in S1001. In a case that the CPU 103 determines YES in S1002, the CPU 103 proceeds to S1003. In a case that the CPU 103 determines NO in S1002, the CPU 103 returns to S1001.

In S1003, the CPU 103 stores, to a memory, information (an SSID and a password) regarding an access point to which the terminal apparatus 101 currently connects. Thereafter, the CPU 103 disconnects the connection between the terminal apparatus 101 and the access point. In a case where the terminal apparatus 101 does not connect to an access point, the processing in S1003 is skipped.

In S1004, the CPU 103 establishes a connection between the terminal apparatus 101 and the access point enabled by the communication apparatus 151 (i.e., the communication apparatus 151 selected in S404) found by the search in S1001. That is, the CPU 103 establishes a connection between the communication apparatus 151 selected in S404 and the terminal apparatus 101. In the present embodiment, it is assumed that a password is not required for the connection to the access point enabled by the communication apparatus 151 operating in the connection setting mode. In the following description, communication between the terminal apparatus 101 and the communication apparatus 151 is performed via the connection established in S1004.

In S1005, the CPU 103 acquires, from the communication apparatus 151 selected in S404, a list of the one or more access points found by the first search processing executed by the communication apparatus 151.

In S1006, the CPU 103 determines whether the information regarding the access point corresponding to the information stored in S1003 is included in the list acquired in S1005. In a case that the CPU 103 determines YES in S1006, the CPU 103 proceeds to S1007. In a case that the CPU 103 determines NO in S1006, the CPU 103 proceeds to S1006. In a case where the information stored in S1003 is not present, the CPU 103 determines NO in S1006.

In S1007, the CPU 103 transmits, to the communication apparatus 151 selected in S404, setting information including the information stored in S1003. That is, the information stored in S1003 is information for connecting to the access point to which the terminal apparatus 101 connected at the time of S1003. When the information stored in S1003 is transmitted to the communication apparatus 151, the communication apparatus 151 connects to the access point corresponding to the information by using the information. Thereafter, the CPU 103 proceeds to S1009.

In S1008, the CPU 103 executes the second connection setting process. The process in S1008 will be described later in detail.

In S1009, the CPU 103 re-establishes a connection between the terminal apparatus 101 and the access point corresponding to the information stored in S1003 by using the information stored in S1003.

In S1010, the CPU 103 searches for, on a network to which terminal apparatus 101 belongs and that has been formed by the access point to which the terminal apparatus 101 connects, the communication apparatus 151 selected in S404 and serving as a transmission destination of the information in S1007. That is, the CPU 103 executes the second search API, thereby instructing the OS to execute the second search processing. Then, the CPU 103 receives a result of the second search processing from the OS and specifies the communication apparatus 151 selected in S404 among one or more apparatuses indicated by the received result and found by the second search processing. In a case that the communication apparatus 151 is found in the above-described manner, the CPU 103 ends the process of the flowchart in FIG. 10 and proceeds to S407. In the processing in S1010, another search other than the second search processing may be executed. Specifically, for example, the CPU 103 may acquire, in advance, an IP address of the communication apparatus 151 selected in S404 and execute unicast search processing using the IP address.

In a case where the information stored in S1003 is not present, S1009 and S1010 are skipped and the CPU 103 proceeds to S407.

Figure 11:
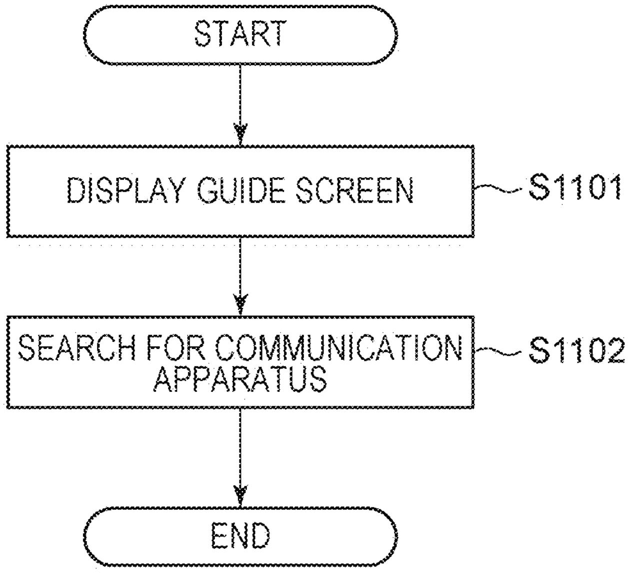
FIG. 11 is a flowchart illustrating a second connection setting process according to the first embodiment of the present invention.

The second connection setting process will be described below in detail. FIG. 11 is a flowchart illustrating the second connection setting process. The flowchart in FIG. 11 is implemented by the CPU 103 reading a program stored in the ROM 104 into the RAM 105 and executing the read program. In the present embodiment, it is assumed that the terminal apparatus 101 executes the process by the setup application. The process of the flowchart in FIG. 11 corresponds to the process in S908.

Figure 12:
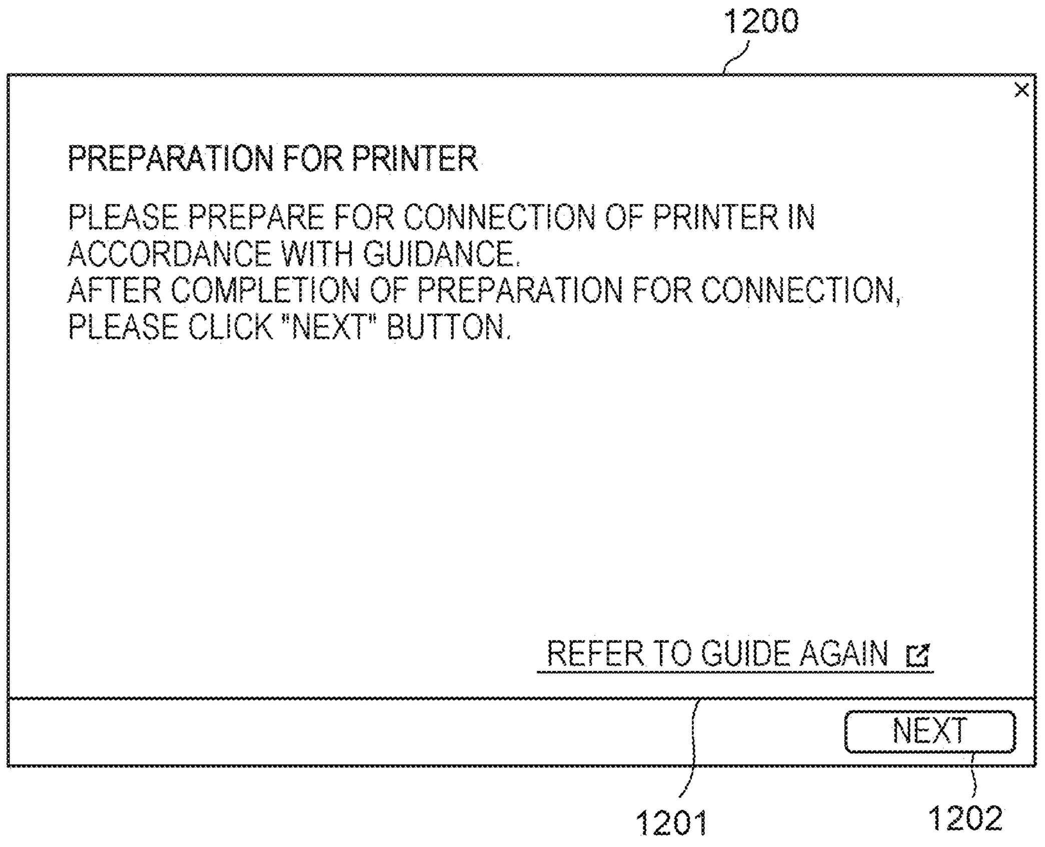
FIG. 12 is a diagram illustrating an example of a guidance screen displayed in the first embodiment of the present invention.

In S1101, the CPU 103 displays, by a web browser, a guide screen (not illustrated) indicating a method for a predetermined operation for establishing the connection between the communication apparatus 151 and the access point without transmitting the setting information to the communication apparatus 151 from the terminal apparatus 101. Specifically, the CPU 103 instructs the web browser to display the guide screen by using an URL held in the setup application in advance and provided for displaying the guide screen, thereby causing the web browser to display the guide screen. The guide screen is displayed in a window displayed by the web browser. The window displayed by the web browser is different from the window displayed by the setup application. The predetermined operation is an operation performed by the user on the communication apparatus 151 and includes an operation for causing the communication apparatus 151 to execute the first search processing, an operation of selecting any one of the one or more access points found by the first search processing, an operation of entering a password of the selected access point, and the like. The predetermined operation is not limited thereto. For example, the predetermined operation may include an operation of causing the communication apparatus 151 to execute connection processing based on Wi-Fi Protected Setup (WPS) and connection processing based on AirStation One-Touch Secure System (AOSS). In the processing in S1101, the CPU 103 further displays, in the window displayed by the setup application, a guidance screen for prompting the user to perform a predetermined operation in accordance with a guide displayed on the guide screen. The guidance screen is a screen displayed by the setup application without an OS standard API being executed by the setup application. FIG. 12 illustrates an example of the guidance screen 1200 displayed in this case. A region 1201 is a link button for displaying the guide screen again by the web browser in a case that the guide screen is closed. The user who performed the predetermined operation in accordance with the guide displayed on the guide screen presses a button in a region 1202. When the button in the region 1202 is pressed, the CPU 103 proceeds to S1102.

As described above, the display of the guide screen is automatically executed by the web browser based on the process having proceeded to S1101. However, the present embodiment is not limited thereto. That is, the display of the guide screen may not be automatically executed by the web browser based on the process having proceeded to S1101. The display of the guide screen may be executed by the web browser for the first time when the region 1201 of the guidance screen 1200 is operated.

In the above description, the guide screen is displayed by the web browser. However, the present embodiment is not limited thereto. The guide screen may not be displayed in the screen displayed by the web browser and may be displayed in the guidance screen 1200 displayed by the setup application. Also, the guide screen may be displayed in a screen displayed by the setup application. In this case, the screen displayed by the setup application is different from the guidance screen 1200.

In S1102, the CPU 103 searches for the communication apparatus 151 selected in S404 on the network to which the terminal apparatus 101 belongs and that has been formed by the access point to which the terminal apparatus 101 connects. That is, the CPU 103 executes the second search API, thereby causing the OS to execute the second search processing. Then, the CPU 103 receives a result of the second search processing from the OS and specifies the communication apparatus 151 selected in S404 among one or more apparatuses indicated by the received result and found by the second search processing. In a case that the communication apparatus 151 is found in the above-described manner, the CPU 103 ends the process of the flowchart in FIG. 12 and proceeds to S407.

In the processing in S1102, a search other than the second search processing may be executed. Specifically, for example, the CPU 103 may acquire, in advance, the IP address of the communication apparatus 151 selected in S404 and execute unicast search processing using the IP address in S1010. After S1102, the CPU 103 ends the process of the flowchart in FIG. 11 and proceeds to S407.

In S407, the CPU 103 downloads and installs a printer driver compatible with the communication apparatus 151 selected in S404. For example, the CPU 103 downloads the printer driver from a server on the Internet via the connection between the terminal apparatus 101 and the access point. The processing executed in the processing in S407 is not limited thereto and may be processing of displaying a screen indicating a method for an operation for downloading the printer driver. In the processing in S407, a program other than the printer driver may be downloaded. Specifically, examples of the program other than the printer driver include a printing application for transmitting a print job to the communication apparatus 151, a scanning application for transmitting a scan job to the communication apparatus 151, and an image layout application for arranging an image in a template to create a layout image or an album.

In S408, the CPU 103 executes processing for creating a print queue compatible with the communication apparatus 151 selected in S404. In the processing in S408, the CPU 103 notifies the OS to create the print queue compatible with the communication apparatus 151 selected in S404. Since the print queue compatible with the communication apparatus 151 selected in S404 is created, the terminal apparatus 101 can cause the communication apparatus 151 selected in S404 to execute printing.

After S408, the CPU 103 transmits the print data acquired in S401 to the communication apparatus 151 selected in S404, thereby causing the communication apparatus 151 selected in S404 to execute test printing. After test printing is executed, the CPU 103 ends the process of the flowchart in FIG. 4.

In the above-described form, in a case where the condition for executing the first search processing by the OS is not satisfied in a certain environment, it is possible to execute processing for satisfying the condition for executing the first search processing. That is, it is possible to suppress the occurrence of a situation in which the connection setting process cannot be executed due to the first search processing not being executed by the OS.

In the above description, in a case that the result of the determination in S906 indicates NO, the CPU 103 immediately proceeds to S908. The present embodiment is not limited thereto. For example, in a case that the result of the determination in S906 indicates NO, the CPU 103 may execute processing (processing that is the same as or similar to S504) of determining whether the second setting has been set to be disabled. In a case that the result of this determination indicates that the second setting has not been set to be disabled, the CPU 103 may execute processing (processing that is the same as or similar to S505) of setting the second setting to be enabled. Thereafter, the CPU 103 may execute again processing (processing that is the same as or similar to S906) of determining whether the second setting has been set to be enabled. In a case that the result of the determination indicates that the second setting has been set to be enabled, the CPU 103 may proceed to S907. In a case that the result of the determination indicates that the second setting has not been set to be enabled, the CPU 103 may proceed to S908.

In the above description, in both the flowchart in FIG. 5 and the flowchart in FIG. 9, the determination as to whether the OS of the terminal apparatus 101 is the predetermined version or higher, the determination as to whether the first setting has been set to be enabled, and the determination as to whether the second setting has been set to be enabled are executed. However, the present embodiment is not limited thereto. For example, the determinations described above may be executed only in the flowchart in FIG. 5 and may not be executed in the flowchart in FIG. 9. In this form, it is assumed by the process of the flowchart in FIG. 5 that the user has enabled both the first setting and the second setting, and the process of the flowchart in FIG. 9 is executed. Therefore, in a case that the result of the determination in S903 indicates YES, the CPU 103 skips the processing in S904 to S906 and proceeds to S907. For example, the determinations described above may be executed only in the flowchart in FIG. 9 and may not be executed in the flowchart in FIG. 5. In this form, after S401, the CPU 103 skips S402 and proceeds to S403. In addition, in this form, the above-described form in which the processing that is the same as or similar to S505 is executed in the flowchart in FIG. 9 is applied.

Second Embodiment

An embodiment for solving the issues that is different from the first embodiment will be described. It is assumed that a system according to the present embodiment and processing executed in the present embodiment are the same as or similar to those described in the first embodiment unless otherwise specified.

The present embodiment is different from the first embodiment in that a process regarding the location-based service in S402 is different from that described in the first embodiment. The process regarding the location-based service according to the present embodiment will be described below in detail with reference to FIG. 13.

Figure 13:
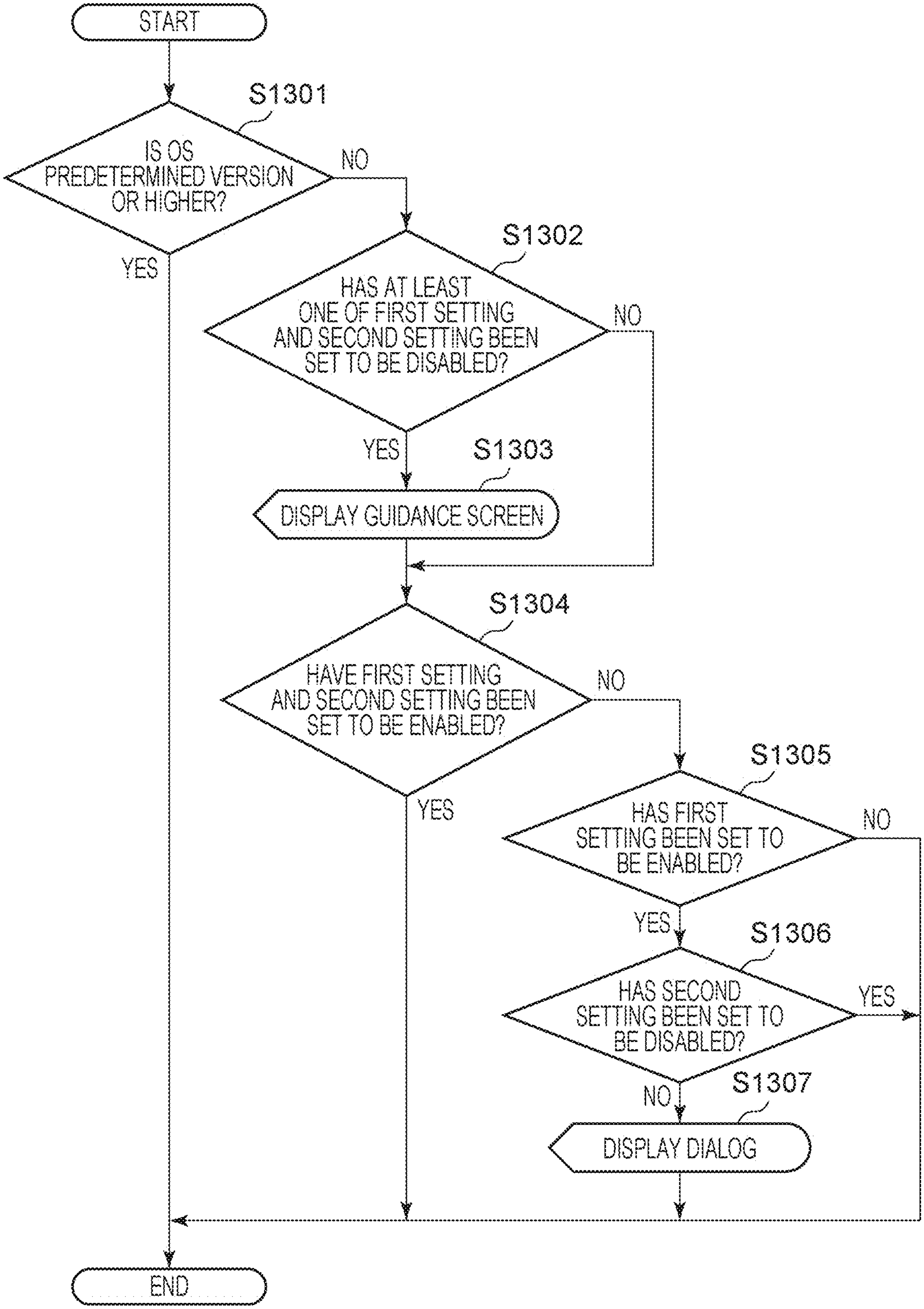
FIG. 13 is a flowchart illustrating a process regarding the location-based service according to a second embodiment of the present invention.

FIG. 13 is a flowchart illustrating the process regarding the location-based service. The flowchart in FIG. 13 is implemented by the CPU 103 reading a program stored in the ROM 104 into the RAM 105 and executing the read program. In the present embodiment, it is assumed that the terminal apparatus 101 executes the process by the setup application. The process of the flowchart in FIG. 13 corresponds to the process in S402.

In S1301, the CPU 103 determines whether the OS of the terminal apparatus 101 is the predetermined version or higher. The processing in S1301 is the same as or similar to the processing in S501. In a case that the CPU 103 determines YES in S1301, the CPU 103 proceeds to S1302. In a case that the CPU 103 determines NO in S1301, the CPU 103 proceeds to S403. That is, in a case that the CPU 103 determines NO in S1301, the CPU 103 proceeds to S403 without executing S1302 to S1307 described later and the CPU 103 executes control such that processing (processing in S1303) for setting the first setting to be enabled is not executed even in a case where the first setting is not set to be enabled. In addition, the CPU 103 executes control such that processing (processing in S1303 and processing in S1307) for setting the second setting to be enabled is not executed even in a case where the second setting is not set to be enabled. That is, in a case that the CPU 103 determines NO in S1301, the CPU 103 executes control regardless of the setting contents of the first setting such that the processing for setting the first setting to be enabled is not executed. In addition, the CPU 103 executes control regardless of the setting contents of the second setting such that the processing for setting the second setting to be enabled is not executed.

In S1302, the CPU 103 determines whether at least one of the first setting and the second setting has been set to be disabled. Specifically, in the processing in S1302, the CPU 103 executes, by the setup application, an OS standard API for acquiring, from the OS, information indicating whether the first setting has been set to be enabled and an OS standard API for acquiring, from the OS, information indicating whether the second setting has been set to be enabled, thereby acquiring the information from the OS by the setup application. The determination in S1302 is executed based on the information acquired in this manner. A case where at least one of the first setting and the second setting is set to be disabled is specifically a case where the first setting is set to be disabled or a case where the first setting is set to be enabled but the second setting is set to be disabled. A case where at least one of the first setting and the second setting is not set to be disabled is specifically a case where both the first setting and the second setting are set to be enabled or a case where the first setting is set to be enabled but the second setting is in the initial state. In a case that the CPU 103 determines YES in S1302, the CPU 103 proceeds to S1303. In a case that the CPU 103 determines NO in S1302, the CPU 103 proceeds to S1304.

Figure 14:
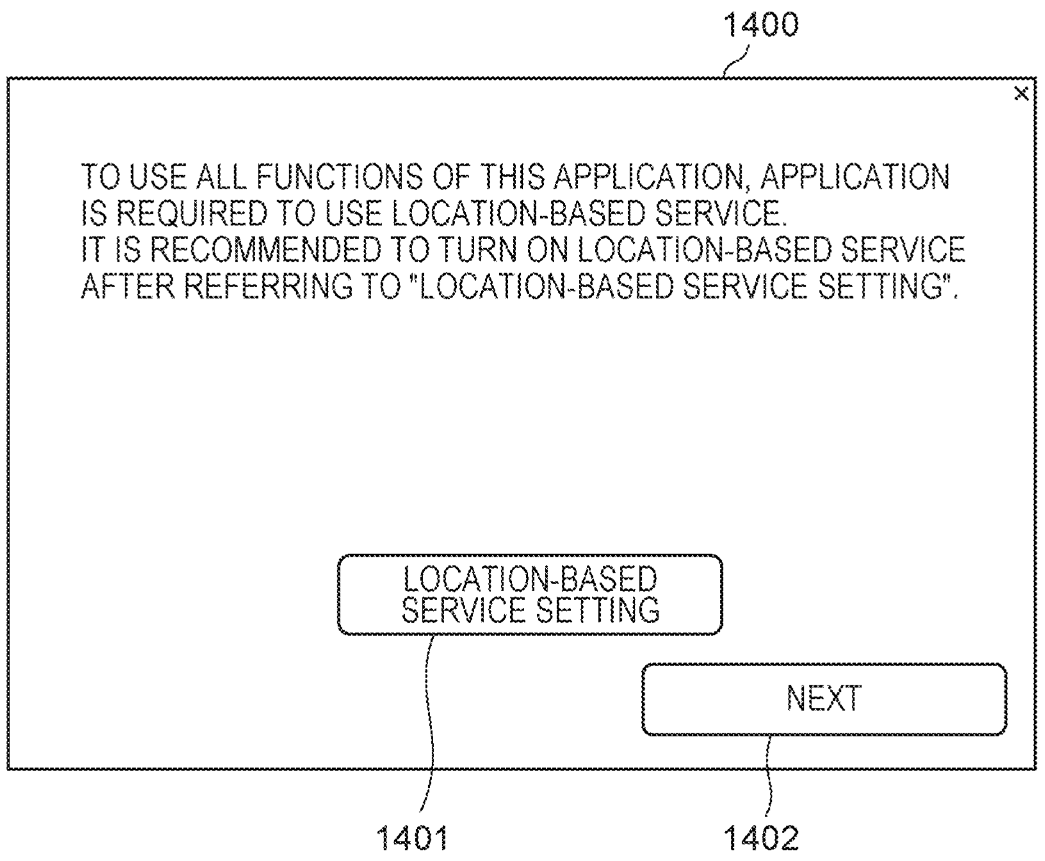
FIG. 14 is a diagram illustrating an example of a guidance screen displayed in the second embodiment of the present invention.

In S1303, the CPU 103 displays a guidance screen for prompting the user to set the first setting to be enabled. The guidance screen is a screen displayed by the setup application without execution of an OS standard API by the setup application. FIG. 14 illustrates an example of the guidance screen 1400 displayed in the processing in S1303. The guidance screen 1400 is displayed in a window displayed by the setup application. The guidance screen 1400 includes a message for prompting the user to set the first setting to be enabled. The message is, in other words, a message that recommends setting the first setting to be enabled. The region 303 for executing a setting regarding the second setting may not be displayed in the setting screen 300 until the dialog 600 is displayed based on an instruction from the setup application. That is, at this timing, the user may not be able to execute the setting regarding the second setting. Therefore, in the processing in S1303, processing of prompting the user to set at least the first setting to be enabled is executed. However, at this timing, the region 303 for executing the setting regarding the second setting may be displayed in the setting screen 300. That is, at this timing, the user may be able to execute the setting regarding the second setting. Therefore, the guidance screen 1400 may be a screen for prompting the user to set both the first setting and the second setting to be enabled. In addition, the guidance screen 1400 may include a message indicating that it is necessary to set the first setting and the second setting to be enabled in order to use a function of the setup application. As described above, since the guidance screen 1400 is a screen displayed by the setup application without use of an OS standard API, the message displayed in the guidance screen 1400 is not a message whose contents are controlled by the OS and is a message whose contents are controlled by the setup application. A region 1401 included in the guidance screen 1400 is a button for displaying the setting screen 300. When the region 1401 is pressed, the CPU 103 notifies the OS standard setting application to display the setting screen 300. Specifically, the CPU 103 executes an OS standard API for displaying the setting screen 300. Therefore, the setting screen 300 is displayed by the OS standard setting application in a window different from the window in which the guidance screen 1400 is displayed. The user performs, on the displayed setting screen 300, an operation of setting the first setting to be enabled. Then, the user operates a region 1402 included in the guidance screen 1400 after performing, on the setting screen 300, the operation of setting the first setting to be enabled. In a case that the region 1402 is operated, the CPU 103 proceeds to S1304.

In S1304, the CPU 103 determines whether both the first setting and the second setting have been set to be enabled. Specifically, in the processing in S1304, the CPU 103 executes, by the setup application, the OS standard API for acquiring, from the OS, information indicating whether the first setting has been set to be enabled and the OS standard API for acquiring, from the OS, information indicating whether the second setting has been set to be enabled, thereby acquiring the information from the OS by the setup application. The determination in S1304 is executed based on the information acquired in this manner. In a case that the CPU 103 determines YES in S1304, the CPU 103 ends the process of the flowchart in FIG. 13 and proceeds to S403. In a case that the CPU 103 determines NO in S1304, the CPU 103 proceeds to S1305.

In S1305, the CPU 103 determines whether the first setting has been set to be enabled.

The processing in S1305 is the same as or similar to the processing in S502. In a case that the CPU 103 determines YES in S1305, the CPU 103 proceeds to S1306. In a case that the CPU 103 determines NO in S1305, the CPU 103 ends the process of the flowchart in FIG. 13 and proceeds to S403.

In S1306, the CPU 103 determines whether the second setting has been set to be disabled. The processing in S1306 is the same as or similar to the processing in S504. In a case that the CPU 103 determines YES in S1306, the CPU 103 ends the process of the flowchart in FIG. 13 and proceeds to S403. In a case that the CPU 103 determines NO in S1306, the CPU 103 proceeds to S1307.

In a case that the information acquired in S1305 indicates the initial state, the CPU 103 determines NO in S1306. The processing in S1304 and S1305 is executed even though the guidance screen 1400 has been displayed in S1303. This is due to the fact that the first setting and the second setting may not be enabled by the user even though the guidance screen 1400 has been displayed.

In S1307, the CPU 103 executes processing for enabling the second setting. The processing in S1307 is the same as or similar to the processing in S505. In a case that the button 601 or the button 602 is operated, the CPU 103 ends the process of the flowchart in FIG. 13 and proceeds to S403.

In the present embodiment, in a case where the first setting is set to be disabled, it is possible to execute the processing for setting the first setting to be enabled. As processing for setting the second setting to be enabled in a case where the second setting is in the initial state, an OS standard function of instructing, by an OS standard API from an application, the OS to display the dialog 600 is prepared. However, as processing for setting the first setting to be enabled and processing for setting the second setting to be enabled in a case where the second setting is set to be disabled, the OS standard function of instructing, by the OS standard API from the application, the OS to display the dialog 600 is not prepared. Therefore, in the present embodiment, as the processing for setting the first setting to be enabled and the processing for setting the second setting to be enabled in a case where the second setting is set to be disabled, the CPU 103 executes processing without using the OS standard function of instructing, by the OS standard API from the application, the OS to display the dialog 600. Specifically, the CPU 103 displays the guidance screen by the setup application without using an OS standard API. In this form, it is possible to easily satisfy the condition for executing the first search processing by the OS. Therefore, it is possible to suppress the occurrence of a situation in which the connection setting process cannot be executed due to the first search processing being not executed by the OS.

In the above-described process, in a case that the result of the determination in S1305 indicates NO or in a case that the result of the determination in S1306 indicates NO, the process of the flowchart in FIG. 13 is ended. The present embodiment is not limited thereto. In a case that the result of the determination in S1305 indicates NO or in a case that the result of the determination in S1306 indicates NO, the CPU 103 may proceed to S1303.

In addition, as described above, a case where the result of the determination in S1302 indicates YES is a case where the first setting is set to be disabled or a case where the first setting is set to be enabled but the second setting is set to be disabled. In the above-described process, in both cases, the guidance screen having the same contents is displayed in S1303. However, the present embodiment is not limited thereto. Different guidance screens may be displayed based on whether the first setting is set to be disabled or the first setting is set to be enabled but the second setting is set to be enabled. Specifically, for example, in a case where the first setting is set to be disabled, a guidance screen for prompting the user to set the first setting to be enabled may be displayed. In a case where the first setting is set to be enabled but the second setting is set to be disabled, a guidance screen for prompting the user to set the second setting to be enabled may be displayed.

In the above-described process, in a case that the result of the determination in S906 indicates NO, the CPU 103 immediately proceeds to S908. However, the present embodiment is not limited thereto. For example, in a case that the result of the determination in S905 indicates NO, processing (processing that is the same as or similar to the processing in S1303) that is executed for enabling the first setting and in which an OS standard API is not used may be executed. Thereafter, for example, in a case that the result of the determination in S906 indicates NO, processing (processing that is the same as or similar to the processing in S504) for determining whether the second setting has been set to be disabled may be executed. In a case that the CPU 103 determines that the second setting has not been set to be disabled, processing (processing that is the same as or similar to the processing in S505) that is executed for enabling the second setting and in which an OS standard API is used may be executed.

In a case that the CPU 103 determines that the second setting has been set to be disabled, processing (processing that is the same as or similar to the processing in S1303) that is executed for enabling the second setting and in which an OS standard API is not used may be executed. Thereafter, the CPU 103 may execute processing (processing that is the same as or similar to the processing in S1304) for determining whether both the first setting and the second setting have been set to be enabled. In a case that the CPU 103 determines that both the first setting and the second setting have been set to be enabled, the CPU 103 may proceed to S907. In a case that the CPU 103 determines that at least one of the first setting and the second setting has not been set to be enabled, the CPU 103 may proceed to S908.

In the above-described process, in S1307, the processing of executing, by the setup application, the OS standard API for displaying the dialog 600 is executed. However, the present embodiment is not limited thereto. The region 303 may be displayed in the region 302 even in a case where the second setting is in the initial state. Therefore, in S1307, for example, processing (processing that is the same as or similar to the processing executed in a case that the region 1401 is pressed) of executing the OS standard API for displaying the setting screen 300 may be executed. In addition, in S1307, for example, processing (processing that is the same as or similar to S1303) of displaying the guidance screen 1400 may be executed without executing an OS standard API.

In both the flowchart in FIG. 13 and the flowchart in FIG. 9, the determination as to whether the OS of the terminal apparatus 101 is the predetermined version or higher, the determination as to whether the first setting has been set to be enabled, and the determination as to whether the second setting has been set to be enabled are executed. However, the present embodiment is not limited thereto. For example, the determinations described above may be executed only in the flowchart in FIG. 13 and may not be executed in the flowchart in FIG. 9. In this form, it is assumed by the process of the flowchart in FIG. 13 that the user has enabled both the first setting and the second setting, and the process of the flowchart in FIG. 9 is executed. Therefore, in a case that the result of the determination in S903 indicates YES, the CPU 103 skips the processing in S904 to S906 and proceeds to S907. In addition, for example, the determinations described above may be executed only in the flowchart illustrated in FIG. 9 and may not executed in the flowchart in FIG. 13. In this form, after S401, the CPU 103 skips S402 and proceeds to S403. In this form, the above-described form in which the processing that is the same as or similar to S505 and the processing that is the same as or similar to S1303 are executed in the flowchart in FIG. 9 is applied.

The form in which the processing in S1303 is executed based on at least one of the first and second settings being set to be disabled is described above. However, the present embodiment is not limited thereto. The processing in S1303 may be necessarily executed regardless of setting states of the first setting and the second setting. That is, specifically, for example, in a case that the result of the determination in S1301 indicates NO, the CPU 103 may skip S1302 and proceed to S1303.

Other Embodiments

In the above description, the first search processing is executed in processing for executing the connection setting process and searching for the communication apparatus 151 operating in the connection setting mode. The form is not limited thereto. Since the first search processing is processing of searching for an access point, the first search processing can be executed in various types of processing other than the processing for executing the connection setting process as long as the first search processing is processing for connecting to an access point. Therefore, the determination as to whether the OS of the terminal apparatus 101 is the predetermined version or higher, the determination as to whether the first setting has been set to be enabled, the determination as to whether the second setting has been set to be enabled, the processing that is the same as or similar to S505, and the processing that is the same as or similar to S1303 may be executed in various types of processing other than the processing for executing the connection setting process. The processing other than the processing for executing the connection setting process is, for example, processing of establishing a connection between an access point found by a search and the terminal apparatus, processing of transmitting various types of information other than the setting information to the access point, and processing of receiving the various types of information from the access point. The information other than the setting information is, for example, image data, print data, audio data, and the like.

In the above description, the OSs included in the terminal apparatuses 101 are MacOS. However, the OSs are not limited thereto. The OSs included in the terminal apparatuses 101 may be another OS such as Android OS (registered trademark), iOS (registered trademark), or the like.

In the above description, the process in S402 is executed after the execution of the processing in S401. However, the process is not limited thereto. The process in S402 may be executed before the execution of the processing in S401.

The object of various embodiments of the present disclosure can be achieved by supplying a storage medium storing a program code of software) for implementing the example functions described above to a system or an apparatus and a computer (or CPU or MPU, for example) of the system or the apparatus reading and executing the program code stored in the storage medium. In such cases, the program code read from the storage medium, when executed, implements the functions described above, and the storage medium storing the program code is included within the scope of the present disclosure.

As the storage medium for supplying the program code, for example, a flexible disk, a hard disk, an optical disc, a magneto-optical disc, a CD-ROM, a CD-R, a magnetic tape, a nonvolatile memory card, a ROM, a DVD, and the like can be used.

The computer reads and executes the program code to not only implement the functions described in the above description of embodiments but also performs some or all of the processes executed by the operating system (OS) or the like on the computer so as to implement the functions described above by the processes.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-160117, filed Sep. 25, 2023, which is hereby incorporated by reference herein in its entirety.

What is claimed is:

1. A method of controlling a first information processing apparatus having a predetermined application program and an operating system (OS) of a first version and a second information processing apparatus having the predetermined application program and an OS of a second version older than the first version, the method of controlling the first information processing apparatus comprising:

in a case where a predetermined setting for permitting the predetermined application program to use a location-based service is not set to be enabled in the first information processing apparatus, executing first processing for setting the predetermined setting to be enabled, based on the OS of the first information processing apparatus being the first version and the predetermined setting not being set to be enabled in the first information processing apparatus;

after the first processing is executed, executing second processing for predetermined search processing of searching for an access point; and executing third processing for transmitting, to a communication apparatus that has enabled the access point found by the predetermined search processing executed based on the second processing having been executed, information regarding another access point different from the access point enabled by the communication apparatus, and the method of controlling the second information processing apparatus comprising:

executing control based on the OS of the second information processing apparatus being the second version such that the first processing is not executed even in a case where the predetermined setting is not set to be enabled in the second information processing apparatus;

executing the second processing; and executing the third processing.

2. The control method according to claim 1, wherein in a case where the predetermined setting is in an initial state in which the predetermined setting is not set to be enabled and not set to be disabled in the first information processing apparatus, the first processing is executed based on the predetermined setting being in the initial state.

3. The control method according to claim 1, wherein in a case where the predetermined setting is set to be disabled in the first information processing apparatus, control is executed based on the predetermined setting being set to be disabled in the first information processing apparatus such that the first processing is not executed.

4. The control method according to claim 1, wherein the first processing is processing of executing an OS standard application programming interface (API) for displaying a dialog for setting the predetermined setting to be enabled.

5. The control method according to claim 1, wherein in a case that the predetermined setting is not set to be enabled even though the first processing has been executed, the predetermined search processing is not executed and other search processing of searching for an apparatus on a network formed by an access point is executed, the other search processing being different from the predetermined search processing.

6. The control method according to claim 5, wherein in a case that the first processing is executed and the predetermined setting is set to be enabled, the predetermined search processing and the other search processing are executed in the first information processing apparatus, and even in a case where the predetermined setting is not set to be enabled in the second information processing apparatus, the predetermined search processing and the other search processing are executed in the second information processing apparatus.

7. The control method according to claim 1, wherein in the first information processing apparatus and the second information processing apparatus, a specific setting for permitting an application program to use the location-based service is allowed to be set to be enabled or disabled and is different from the predetermined setting, and the predetermined setting is a setting for selecting the predetermined application program as the application program permitted by the specific setting to use the location-based service.

8. The control method according to claim 7, wherein in a case where the specific setting is set to be enabled and the predetermined setting is set to be enabled, the predetermined search processing is executed based on the second processing having been executed, and in a case where the specific setting is not set to be enabled, and in a case where the specific setting is set to be enabled and the predetermined setting is not set to be enabled, the predetermined search processing is not executed even in a case that the second processing is executed.

9. The control method according to claim 7, further comprising:

causing a computer of the first information processing apparatus to, in a case where the specific setting is not set to be enabled, execute fourth processing for setting the specific setting to be enabled, based on the OS of the first information processing apparatus being the first version and the specific setting not being set to be enabled in the first information processing apparatus; and causing a computer of the second information processing apparatus to execute control based on the OS of the second information processing apparatus being the second version such that the fourth processing is not executed even in a case where the specific setting is not set to be enabled in the second information processing apparatus.

10. The control method according to claim 9, wherein the fourth processing is processing for displaying, by an OS standard setting application program, a screen for setting the specific setting to be enabled.

11. The control method according to claim 9, wherein the fourth processing is processing for prompting a user to set the specific setting to be enabled.

12. The control method according to claim 9, wherein the fourth processing is processing of displaying, by the predetermined application program, a screen for setting the specific setting to be enabled without executing an OS standard application programming interface (API).

13. The control method according to claim 9, wherein in a case where the predetermined setting is not set to be enabled in the first information processing apparatus after the fourth processing is executed, the first processing is executed based on the OS of the first information processing apparatus being the first version and the predetermined setting not being set to be enabled in the first information processing apparatus.

14. The control method according to claim 1, wherein the second processing is processing of executing an OS standard application programming interface (API) for the predetermined search processing.

15. The control method according to claim 1, wherein in the first information processing apparatus, control is executed such that the third processing is executed in a case where the predetermined setting is set to be enabled in the first information processing apparatus and that the third processing is not executed in a case where the predetermined setting is not set to be enabled in the first information processing apparatus, and in the second information processing apparatus, the third processing is executed even in a case where the predetermined setting is not set to be enabled in the second information processing apparatus.

16. The control method according to claim 1, further comprising causing a computer of the first information processing apparatus to, in a case where the predetermined setting is not set to be enabled in the first information processing apparatus, execute processing for establishing a connection between the communication apparatus and the other access point without transmitting information regarding the other access point to the first information processing apparatus.

17. The control method according to claim 1, wherein the communication apparatus is a printing apparatus.

18. The control method according to claim 1, wherein the OS of the first information processing apparatus and the OS of the second information processing apparatus are MacOS (registered trademark).

19. The control method according to claim 18, wherein the first version is MacOS 14 or higher and the second version is MacOS 13 or lower.

20. A non-transitory storage medium storing a program that is a predetermined application program for causing a computer of a first information processing apparatus having an operating system (OS) of a first version to:

in a case where a predetermined setting for permitting the predetermined application program to use a location-based service is not set to be enabled in the first information processing apparatus, execute first processing for setting the predetermined setting to be enabled, based on the OS of the first information processing apparatus being the first version and the predetermined setting not being set to be enabled in the first information processing apparatus;

after the first processing is executed, execute second processing for predetermined search processing of searching for an access point; and execute third processing for transmitting, to a communication apparatus that has enabled the access point found by the predetermined search processing executed based on the second processing having been executed, information regarding another access point different from the access point enabled by the communication apparatus, and the predetermined application program causing a computer of a second information processing apparatus having an OS of a second version older than the first version to:

execute control based on the OS of the second information processing apparatus being the second version such that the first processing is not executed even in a case where the predetermined setting is not set to be enabled in the second information processing apparatus;

execute the second processing; and execute the third processing.

* * * * *